(12) United States Patent
Nobuhara et al.

(10) Patent No.: US 11,584,293 B2
(45) Date of Patent: Feb. 21, 2023

(54) VEHICLE COMMUNICATION SYSTEM, VEHICLE MODULE, FRONT COMPOSITE MODULE, AND VEHICLE LAMP

(71) Applicant: KOITO MANUFACTURING CO., LTD., Tokyo (JP)

(72) Inventors: Kenji Nobuhara, Shizuoka (JP); Yosuke Sakauchi, Shizuoka (JP); Hiroya Koizumi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 225 days.

(21) Appl. No.: 16/770,385

(22) PCT Filed: Oct. 23, 2018

(86) PCT No.: PCT/JP2018/039383
§ 371 (c)(1),
(2) Date: Jun. 5, 2020

(87) PCT Pub. No.: WO2019/111565
PCT Pub. Date: Jun. 13, 2019

(65) Prior Publication Data
US 2020/0384913 A1 Dec. 10, 2020

(30) Foreign Application Priority Data

Dec. 7, 2017 (JP) .............................. JP2017-235247
Dec. 7, 2017 (JP) .............................. JP2017-235248
(Continued)

(51) Int. Cl.
*B60Q 1/50* (2006.01)
*F21S 43/236* (2018.01)
(Continued)

(52) U.S. Cl.
CPC ............... *B60Q 1/50* (2013.01); *B60Q 1/503* (2013.01); *F21S 43/236* (2018.01);
(Continued)

(58) Field of Classification Search
CPC ...................................................... B60Q 1/503
See application file for complete search history.

(56) References Cited

U.S. PATENT DOCUMENTS

2002/0138181 A1 9/2002 Mori et al.
2018/0173237 A1* 6/2018 Reiley ................. G05D 1/0061
(Continued)

FOREIGN PATENT DOCUMENTS

CN 105946701 A 9/2016
JP 9-277887 A 10/1997
(Continued)

OTHER PUBLICATIONS

International Search Report (PCT/ISA/210) dated Jan. 22, 2019 by the International Searching Authority in counterpart International Patent Application No. PCT/JP2018/039383.
(Continued)

*Primary Examiner* — Sean P Gramling
(74) *Attorney, Agent, or Firm* — Sughrue Mion, PLLC

(57) ABSTRACT

A vehicle communication system installed in a vehicle includes: a lamp for illumination, a display or signal; a display that is configured by a planar light emitter and has an information display function; and a control unit that is capable of controlling turning-on of the lamp and of the display. The control unit is configured to control the lamp and the display in a linked manner, and present vehicle information indicating a condition of the vehicle by combining light emission of the lamp with information display of the display.

12 Claims, 20 Drawing Sheets

(30) Foreign Application Priority Data

Dec. 7, 2017 (JP) .............................. JP2017-235249
Dec. 7, 2017 (JP) .............................. JP2017-235250

(51) Int. Cl.
 *F21S 43/249* (2018.01)
 *F21V 23/00* (2015.01)
(52) U.S. Cl.
 CPC ......... *B60Q 2400/50* (2013.01); *F21S 43/249* (2018.01); *F21V 23/00* (2013.01)

(56) References Cited

U.S. PATENT DOCUMENTS

| | | |
|---|---|---|
| 2018/0228004 A1 | 8/2018 | Masuda et al. |
| 2019/0001818 A1 | 1/2019 | Sakata et al. |
| 2019/0289696 A1 | 9/2019 | Masuda et al. |

FOREIGN PATENT DOCUMENTS

| | | |
|---|---|---|
| JP | 10-989 A | 1/1998 |
| JP | 2001-43493 A | 2/2001 |
| JP | 2002-274277 A | 9/2002 |
| JP | 2003-63276 A | 3/2003 |
| JP | 2008-81048 A | 4/2008 |
| JP | 2008081048 A * | 4/2008 |
| JP | 2010-137758 A | 6/2010 |
| JP | 2013-243000 A | 12/2013 |
| JP | 2014-8810 A | 1/2014 |
| JP | 2014-8837 A | 1/2014 |
| JP | 2014-17097 A | 1/2014 |
| JP | 2016-40159 A | 3/2016 |
| WO | 2017/073248 A1 | 5/2017 |
| WO | 2017/138147 A1 | 8/2017 |

OTHER PUBLICATIONS

Written Opinion (PCT/ISA/237) dated Jan. 22, 2019 by the International Searching Authority in counterpart International Patent Application No. PCT/JP2018/039383.

Certificate for the application of exceptions to lack of novelty submitted Dec. 22, 2017, in counterpart Japanese Patent Office No. 2017-235249.

Certificate for the application of exceptions to lack of novelty submitted Dec. 22, 2017, in counterpart Japanese Patent Office No. 2017-235247.

Certificate for the application of exceptions to lack of novelty submitted Dec. 22, 2017, in counterpart Japanese Patent Office No. 2017-235250.

Certificate for the application of exceptions to lack of novelty submitted Dec. 22, 2017, in counterpart Japanese Patent Office No. 2017-235248.

Koito "Lighting for your safety" Published at the 45th Tokyo Motor Show 2017, Oct. 25 to Nov. 5, 2017, (6 pages total).

* cited by examiner

VEHICLE COMMUNICATION SYSTEM, VEHICLE MODULE, FRONT COMPOSITE MODULE, AND VEHICLE LAMP

TECHNICAL FIELD

The present invention relates to a vehicle communication system.

The present invention also relates to a vehicle module.

The present invention also relates to a front composite module.

The present invention also relates to a vehicle lamp.

BACKGROUND ART

Currently, research on automated driving technology of automobiles has been actively conducted in many countries, and legislation for enabling a vehicle to travel on a public road in an automated driving mode has been studied in the countries. Here, the automated driving mode refers to a mode in which traveling of a vehicle is automatically controlled. On the other hand, a manual driving mode refers to a mode in which the traveling of the vehicle is controlled by a driver. In an automated driving vehicle, traveling of the vehicle is automatically controlled by a computer.

Patent Literature 2, Patent Literature 3 and the like have proposed a rear module that integrally includes a vehicle lamp, a rear window, and the like.

Patent Literature 4 and the like have proposed a vehicle headlamp that emits light toward the outside of a vehicle.

CITATION LIST

Patent Literature

Patent Literature 1: JP-A-9-277887
Patent Literature 2: JP-A-2014-8810
Patent Literature 3: JP-A-2014-8837
Patent Literature 4: JP-A-2013-243000

SUMMARY OF INVENTION

Technical Problem

For example, in a vehicle in a manual driving mode, a driver of the own vehicle uses a communication means such as a body motion (gesture or expression) to transmit his or her intention to another traffic participant (driver of another vehicle or pedestrian), and an reads an intention of another traffic participant. On the other hand, in a vehicle in which an automated driving mode is being executed, since a driver of the own vehicle cannot uses a communication means such as a body motion, smoothing of traffic flow may be hindered without being able to communicate with another traffic participant (hereinafter, referred to as a traffic person).

Accordingly, one object of the present invention is to provide a vehicle communication system capable of establishing communication between an own vehicle and a traffic person.

Further, a technique has been known in which a display is installed in place of a rear window in a rear module and various kinds of marker functions are exerted by the display and a lamp. However, there is room for improvement in operatability of the rear module.

Accordingly, one object of the present invention is to provide a vehicle module capable of improving operatability.

Further, a vehicle lamp in the related art in which a head lamp and a sensor are integrated is mounted on a lower portion of a front surface of a vehicle away from a front window. On the other hand, in recent years, automated driving vehicles, electric vehicles, and the like have been developed and the degree of freedom of automobile design has increased.

Accordingly, one object of the present invention is to provide a front composite module having a novel design characteristic.

In the related art, a vehicle headlamp that emits light toward the outside of a vehicle, and a light emitting portion of an instrument panel or the like that is directed toward the inside of the vehicle and that displays information have been treated as separate units. On the other hand, in recent years, automated driving vehicles, electric vehicles, and the like have been developed and the degree of freedom of automobile design has increased.

Accordingly, one object of the present invention is to provide a vehicle lamp having novel a design characteristic.

Solution to Problem

In order to achieve the above objects, the present invention provides a vehicle communication system installed in a vehicle, including:

a lamp for illumination, display or signal:

a display that is configured by a planar light emitter and has an information display function; and a control unit that is configured to control turning-on of the lamp and of the display, in which the control unit is configured to control the lamp and the display in a linked manner, and to present vehicle information indicating a condition of the vehicle by a combination of light emission of the lamp and information display of the display.

According to the vehicle communication system described above, since the vehicle information can be provided to a traffic person by an integral presentation of the lamp and the display, communication between the own vehicle and the traffic person can be established. Accordingly, smooth traffic in a traffic society can be realized.

In addition, in the vehicle communication system described above, the lamp may include left and right headlamps that constitute a part of a front module disposed at a front portion of the vehicle, the display may include a first display that is disposed on a lower side of the front module, and the control unit may be configured to present a human facial expression as the vehicle information by turning on the headlamp and causing the first display to display a pattern of a shape imitating a human mouth.

According to this configuration, a facial expression (for example, a smiling face) can be presented as vehicle information. Accordingly, for example, when the traffic person is an acquaintance with the user of the own vehicle, the communication between the own vehicle and the traffic person can be promoted by presenting an imitated smiling face using the lamp and the display.

In addition, in the vehicle communication system described above, the display may include a second display that is disposed at a rear portion of the vehicle, the lamp may include a marker lamp that is disposed on left and right sides of the second display, and the control unit may be configured to control information display of the second display and turning-on of the marker light in a linked manner to exert a predetermined marker function.

According to this configuration, it is possible to effectively exert various kinds of marker functions (for example, a turn signal, and stop) by causing the marker lamp and the display to cooperate with each other.

In addition, in the vehicle communication system described above, the control unit may be configured to control at least one of the headlamp and the first display and at least one of the marker lamp and the second display in a linked manner to present the vehicle information.

According to this configuration, for example, when passing the traffic person, by performing linked information display with at least one of the headlamp and the first display, which are at the front portion of the vehicle, and with at least one of the marker lamp and the second display, which are at the rear portion of the vehicle, new communication between the own vehicle and the traffic person can be supported.

In addition, the vehicle communication system may further include an environment information acquisition unit that is configured to acquire environment information of surroundings of the vehicle, and the control unit may be configured to control the lamp and the display in a linked manner based on the environment information to present the vehicle information.

According to this configuration, appropriate vehicle information can be provided to the traffic person in accordance with the environment information.

In addition, the vehicle communication system may further include a road surface drawing lamp that is configured to display at least a part of the vehicle information on a road surface.

According to this configuration, the communication between the own vehicle and the traffic person can be further promoted.

In addition, in the vehicle communication system described above, the vehicle information may include information indicating that the vehicle is executing an automated driving mode.

According to this configuration, the smooth traffic can be realized even in the automated driving mode.

In addition, in the vehicle communication system described above, the marker lamp may be configured by a plurality of long light emitters, the plurality of light emitters may be arranged in parallel in a left-right direction of the vehicle, and the control unit may be configured to turn on the plurality of light emitters in a stepwise manner in linkage with the second display.

According to this configuration, various kinds of marker functions (for example, a turn signal, and stop) can be exerted by combining the display with the plurality of long light emitters that are arranged in parallel on the left and right sides.

In addition, in the vehicle communication system described above, the second display may be formed to have a curved shape in the left-right direction, and the plurality of light emitters may be arranged on an extension line of the curved shape of the second display.

According to this configuration, visibility of the second display and the marker lamp (in particular, from a rear side of the vehicle) can be improved.

Further, in order to achieve the above objects, the present invention provides a vehicle module installed on an outer side of a vehicle, which integrally includes:

a display that is configured by a planar light emitter and has an information display function; and a lamp for illumination, display or signal, and which is movable with respect to a vehicle body.

According to the vehicle module of the present disclosure, since the module in which the display and the lamp are integrated is movable with respect to the vehicle body, operatability of the vehicle module can be improved.

In addition, the vehicle module described above may further include a sensor that is configured to acquire environment information of surroundings of the vehicle, and may be configured to be movable based on the environment information acquired by the sensor.

According to this configuration, visibility of the display and the lamp from around the vehicle can be improved.

In addition, in the vehicle module described above, the lamp may be disposed at each of left and right sides of the display, the sensor may include a camera and a LiDAR, the camera may be disposed at a center on a lower side of the display, and the LiDAR may be disposed on a lower side of each lamp.

According to this configuration, in the module in which the display, the lamp, and the sensor are integrated, by setting an installing position of the lamp or the sensor (camera, LiDAR) as described above, space at an outer side of the vehicle can be efficiently used and environment information of surroundings of the vehicle can be appropriately acquired.

In addition, in the vehicle module described above, the lamp may be configured by a plurality of long light emitters having different lengths, the plurality of light emitters may be arranged in parallel in a left-right direction of the vehicle, and the plurality of light emitters may be arranged such that lengths of the light emitters decrease as the plurality of light emitters get away from the display.

According to this configuration, various kinds of marker functions (for example, a turn signal, and stop) can be exerted by combining the plurality of long light emitters having different lengths with the display.

In addition, in the vehicle module described above, the plurality of light emitters may be configured by a light guide that guides and diffuses light from a light source, and the light source may be configured by at least one first light emitting unit having a light emitting element that emits light in amber, at least one second light emitting unit having a light emitting element that emits light in red, at least one third light emitting unit having a light emitting element that emits light in colors of RGB, and a substrate on which the first light emitting unit, the second light emitting unit, and the third light emitting unit are installed.

According to this configuration, the lamp can be caused to emit light in appropriate colors and light quantities for exerting the functions of various marker lights such as turn signals and stop, and can be combined with the display to provide various kinds of information to a traffic person (other vehicles, pedestrians, and the like).

In addition, in the vehicle module described above, a step that reflects light from the light source may be formed on a back surface side of the light guide, and a diffusion material may be dispersed in the entire light guide.

According to this configuration, the entire light guide can emit light substantially uniformly.

In addition, the vehicle module described above may be disposed at a rear portion of the vehicle, and the display may be formed to have a curved shape that is convex rearward in the left-right direction of the vehicle.

According to this configuration, the visibility of the display can be further improved.

In order to achieve the above objects, the present invention provides a front composite module for a vehicle, the front composite module including: a headlamp that emits light to an outside of the vehicle; and a sensor, and being disposed at a pillar of the vehicle or at an extension region on a lower side thereof.

According to the front composite module for a vehicle which has the configuration described above, since the front composite module is disposed at the pillar or at the extension region on a lower side thereof, a novel design characteristic is exhibited, and since the headlamp and the sensor are accommodated in the same module, arrangement efficiency is good, and in-vehicle space can be efficiently used.

In addition, in the front composite module described above, the headlamp may be provided at each of left and right sides of the vehicle, the front composite module may further include:

a first connection portion that connects headlamps on both sides outside the vehicle; and a second connection portion that connects the headlamps on both sides inside the vehicle, and the headlamp, the first connection portion, and the second connection portion may be arranged in an annular shape.

According to this configuration, assembly at the time of assembling the vehicle is made easy, and a novel design is constituted with the headlamp, the first connection portion, and the second connection portion.

In the front composite module having the configuration described above, the headlamp may include a first light emitting portion on an upper side and a second light emitting portion on a lower side, and a sensor may be disposed between the first light emitting portion and the second light emitting portion According to this configuration, the arrangement efficiency of the headlamp and the sensor is good, and the in-vehicle space can be efficiently used.

In the front composite module having the configuration described above, the sensor may include at least one of a LiDAR, a camera, and a radar.

Further, in order to achieve the above objects, the present invention provides a vehicle lamp, including:

a first lamp unit; and a second lamp unit, in which the first lamp unit includes a first light emitting portion that is configured to emit light toward an outside of a vehicle, the second lamp unit includes a second light emitting portion that is configured to emit light toward an inside of the vehicle, and the first lamp unit and the second lamp unit are arranged such that the first light emitting portion and the second light emitting portion are continuous.

According to the vehicle lamp having the configuration described above, since the light emitting portions configured to emit light toward the outside and inside of the vehicle are configured to be continuous, a novel design characteristic is exhibited and a new impression can be provided to a pedestrian and a passenger.

In addition, in the vehicle lamp described above, the first lamp unit and the second lamp unit may be arranged such that the first light emitting portion and the second light emitting portion are combined in an annular shape.

According to this configuration, since the light emitting portions configured to emit light toward the outside and inside of the vehicle are configured to be in an annular shape and continuous, a further novel design characteristic is exhibited and a new impression can be provided to the pedestrian and the passenger. Further, assembly at the time of assembling the vehicle is made easy.

In the vehicle lamp having the configuration described above, at least one of the first light emitting portion and the second light emitting portion may be configured to display behavioral information relating to a behavior of the vehicle.

According to this configuration, since the information relating to the behavior of the vehicle can be displayed, the behavior of the vehicle can be transmitted to at least one of a target outside the vehicle such as the pedestrian and the passenger in the vehicle.

In the vehicle lamp having the configuration described above, the first light emitting portion and the second light emitting portion may be configured to display behavioral information relating to a behavior of the vehicle.

According to this configuration, since the information relating to the behavior of the vehicle can be displayed both outside and inside the vehicle, the behavior of the vehicle can be transmitted to the target outside the vehicle such as the pedestrian and the passenger in the vehicle.

In the vehicle lamp having the configuration described above, the behavioral information may include prediction information relating to a behavior of the vehicle.

In this case, since not only the information relating to the current behavior of the vehicle but also the prediction information relating to future behavior of the vehicle is included, prediction of the future behavior of the vehicle can be transmitted to at least one of the target outside the vehicle such as the pedestrian and the passenger in the vehicle.

In the vehicle lamp having the configuration described above, at least one of the first light emitting portion and the second light emitting portion displays information for communicating with a target outside or inside the vehicle.

According to this configuration, communication with at least one of the target outside the vehicle such as the pedestrian and the passenger in the vehicle can be performed, thereby promoting communication between persons by attracting attention of a person in the vehicle and of a pedestrian.

Advantageous Effects of Invention

According to the present invention, it is possible to provide a vehicle communication system that is capable of establishing communication between an own vehicle and a traffic person.

Further, according to the present invention, it is possible to provide a vehicle module that is capable of improving operatability.

Further, since the front composite module of the present invention is disposed at a pillar or at an extension region on a lower side thereof, a novel design characteristic is exhibited.

Further, according to the present invention, it is possible to provide a vehicle lamp having a novel design characteristic.

DESCRIPTION OF EMBODIMENTS

Figure 1:
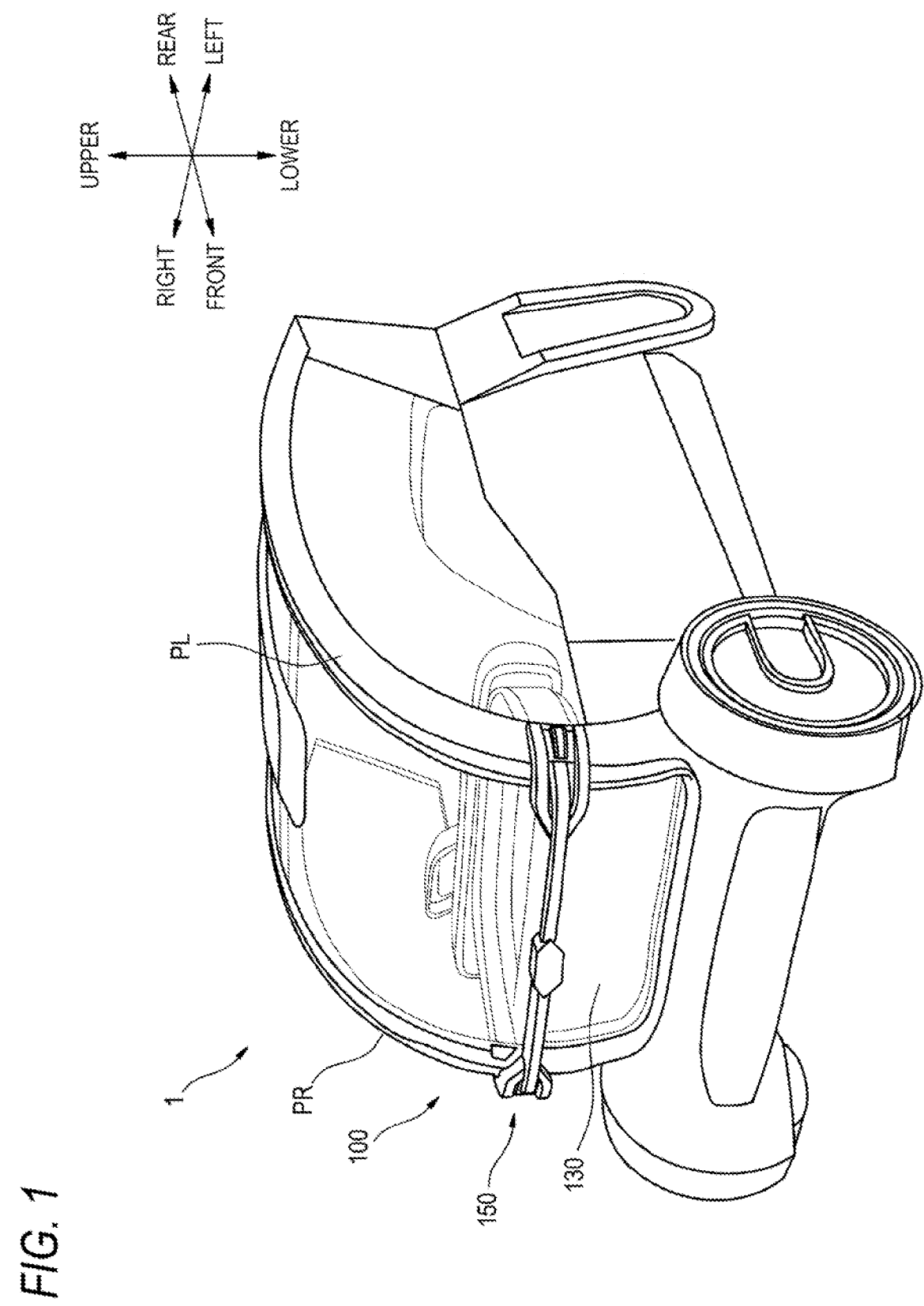
FIG. 1 is a front perspective view of a vehicle including a vehicle communication system according to an embodiment of the present invention.

Hereinafter, an embodiment of the present invention (hereafter, referred to as "the present embodiment") will be described with reference to the drawings. Description of members having the same reference numerals as those already described in description of the present embodiment will be omitted for convenience of description.

In the description of the present embodiment, a "left-right direction", a "front-rear direction", and an "upper-lower direction" will be appropriately referred to for convenience of description. These directions are relative directions set for a vehicle 1 illustrated in FIG. 1. Here, the "upper-lower direction" is a direction including an "upper direction" and a "lower direction". The "front-rear direction" is a direction including a "front direction" and a "rear direction". The "left-right direction" is a direction including a "left direction" and a "right direction".

First Embodiment

Figure 2:
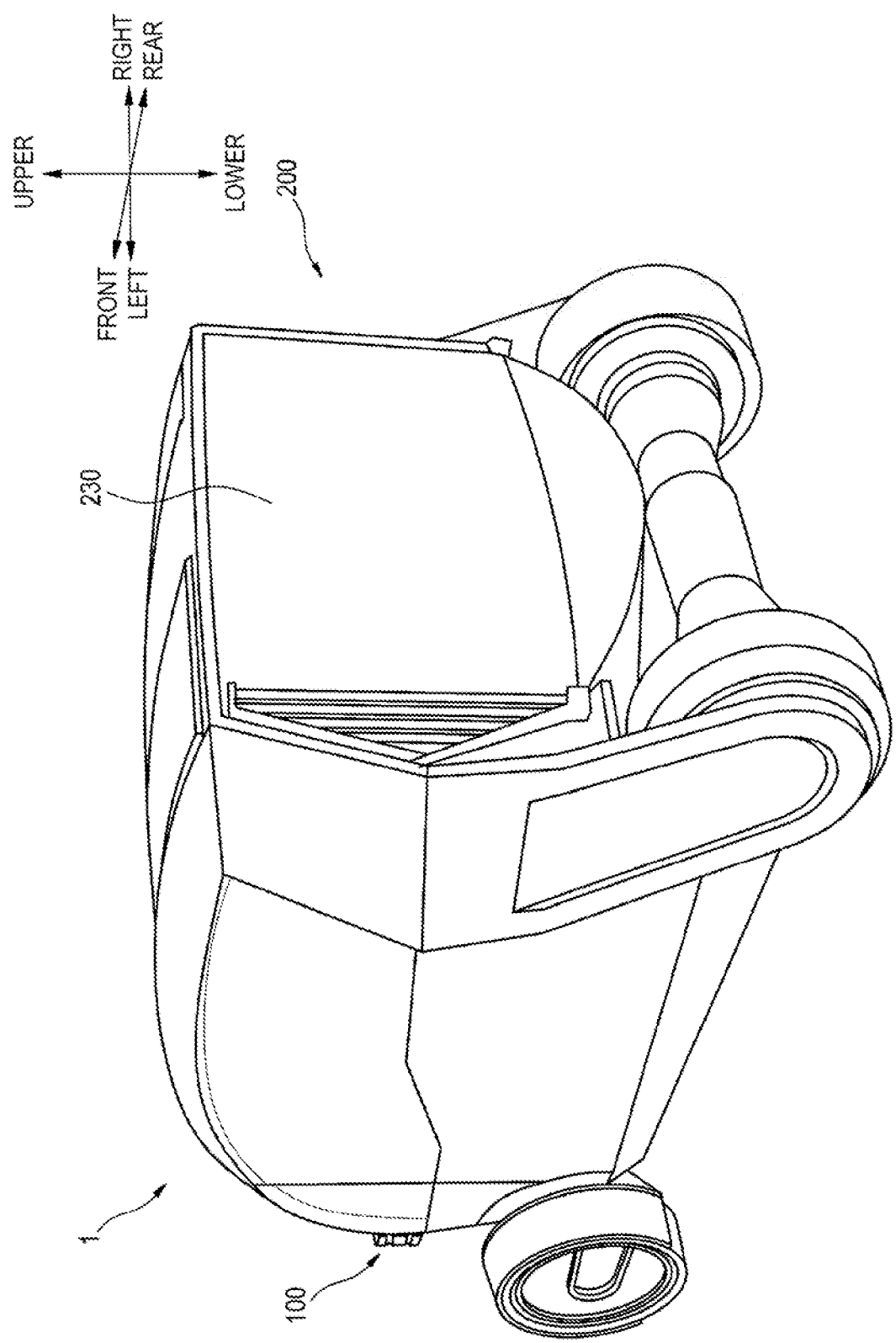
FIG. 2 is a rear perspective view of the vehicle of FIG. 1.

FIG. 1 is a front perspective view of a vehicle 1 in which a vehicle communication system according to a first embodiment is installed. FIG. 2 is a rear perspective view of the vehicle 1. The vehicle 1 is, for example, an automobile that is capable of traveling in an automated driving mode. As illustrated in FIGS. 1 and 2, a front composite system 100, which constitutes at least a part of a vehicle communication system 20, and a rear composite system 200 are installed in the vehicle 1.

Figure 3:
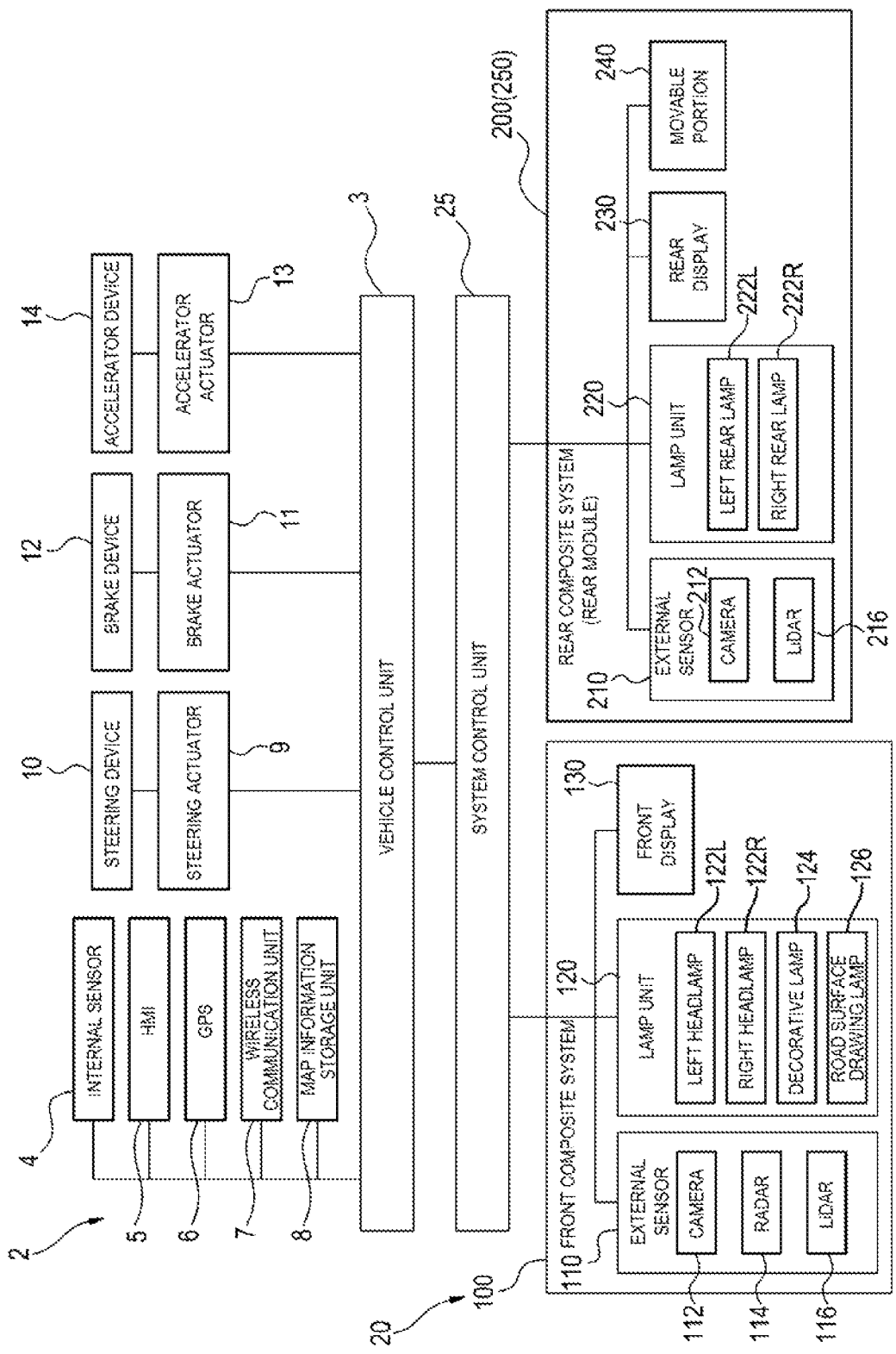
FIG. 3 is a functional block diagram of a vehicle system and of a vehicle communication system.

FIG. 3 is a functional block diagram of a vehicle system 2 and the vehicle communication system 20 which are installed in the vehicle 1.

First, the vehicle system 2 will be described with reference to FIG. 3. As illustrated in FIG. 3, the vehicle system 2 includes a vehicle control unit 3, an internal sensor 4, an human machine interface (HMI) 5, a global positioning system (GPS) 6, a wireless communication unit 7, and a map information storage unit 8. The vehicle system 2 further includes a steering actuator 9, a steering device 10, a brake actuator 11, a brake device 12, an accelerator actuator 13, and an accelerator device 14.

The vehicle control unit 3 is constituted by, for example, at least one electronic control unit (ECU). The electronic control unit may include at least one microcontroller including one or more processors and one or more memories, and another electronic circuit including an active element such as a transistor and a passive element. The processor is, for example, a central processing unit (CPU), a micro processing unit (MPU), a graphics processing unit (GPU), and/or a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for automated driving. The AI program is a program constructed by deep learning such as supervised or unsupervised machine learning using a neural network. The RAM may temporarily store a vehicle control program, vehicle control data, and/or environment information of surroundings indicating a surrounding environment of a vehicle. The processor may be configured to load a designated program from vehicle control programs stored in a storage device or the ROM into the RAM and execute various kinds of processing in cooperation with the RAM.

The electronic control unit may be constituted by an integrated circuit (hardware resource) such as an application specific integrated circuit (ASIC) or a field-programmable gate array (FPGA). Further, the electronic control unit may be constituted by a combination of at least one microcontroller and an integrated circuit.

The internal sensor 4 includes an acceleration sensor, a speed sensor, a gyro sensor, and the like. The internal sensor 4 is configured to detect a traveling state of the vehicle 1 and output traveling state information to the vehicle control unit 3. The internal sensor 4 may further include a seating sensor that detects whether a driver is seated in a driver's seat, a face orientation sensor that detects a direction of the driver's face, an external weather sensor that detects an external weather condition, a human detection sensor that detects whether there is a person in the vehicle, and the like. Further, the internal sensor 4 may include an illuminance sensor that detects illuminance of the surrounding environment of the vehicle 1.

The HMI 5 is constituted by an input unit that receives an input operation from the driver, and an output unit that outputs traveling information and the like to the driver. The input unit includes a steering wheel 15 (see FIG. 4), a driving mode switching switch that switches a driving mode of the vehicle 1, and the like. The output unit is a display that displays various kinds of traveling information.

The GPS 6 is configured to acquire current location information of the vehicle 1 and output the acquired current location information to the vehicle control unit 3. The wireless communication unit 7 is configured to receive traveling information of other vehicles around the vehicle 1 from the other vehicles and transmit the traveling information of the vehicle 1 to the other vehicles (vehicle-to-vehicle communication). The wireless communication unit 7 is configured to receive infrastructure information from infrastructure equipment such as a signal device or a marker lamp and transmit the traveling information of the vehicle 1 to the infrastructure equipment (road-to-vehicle communication). The map information storage unit 8 is an external storage device such as a hard disk drive in which map information is stored, and is configured to output map information to the vehicle control unit 3.

Next, a driving mode of the vehicle 1 will be described. The driving mode includes a fully automated driving mode, an advanced driving support mode, a driving support mode, and a fully manual driving mode. In the fully automated driving mode, the vehicle system 2 automatically performs all of traveling controls of a steering control, a brake control, and an accelerator control, and it is in a state where the driver is unable to drive the vehicle 1. In the advanced driving support mode, the vehicle system 2 automatically performs all of the traveling controls of the steering control, the brake control, and the accelerator control, and the driver does not drive the vehicle 1 although it is in a state where the driver is able to drive the vehicle 1. In the driving support mode, the vehicle system 2 automatically performs a part of the traveling controls of the steering control, the brake control, and the accelerator control, and the driver drives the vehicle 1 under driving support of the vehicle system 2. On the other hand, in the fully manual driving mode, the vehicle system 2 does not automatically perform the traveling control, and the driver drives the vehicle 1 without driving support of the vehicle system 2.

The driving mode of the vehicle 1 may be switched by operating the driving mode switching switch. In this case, the vehicle control unit 3 switches the driving mode of the vehicle 1 between the four driving modes (the full automated driving mode, the advanced driving support mode, the driving support mode, and the fully manual driving mode) in accordance with an operation of the driver with respect to the driving mode switching switch. The driving mode of the vehicle 1 may be automatically switched based on information on a travel-permitted section where an automated driving vehicle can travel, information on a travel-prohibited section where traveling of the automated driving vehicle is prohibited, or information on an external weather condition. In this case, the vehicle control unit 3 switches the driving mode of the vehicle 1 based on the external information. Further, the driving mode of the vehicle 1 may be automatically switched by using the seating sensor, the face orientation sensor, or the like. In this case, the vehicle control unit 3 switches the driving mode of the vehicle 1 based on an output signal from the seating sensor or from the face orientation sensor.

When the vehicle 1 travels in the fully automated driving mode or the advanced driving support mode, the vehicle control unit 3 automatically generates at least one of a steering control signal, an accelerator control signal, and a brake control signal, based on the external information such as the traveling state information, the surrounding environment information, the current location information, and the map information. The steering actuator 9 is configured to receive the steering control signal from the vehicle control unit 3 and control the steering device 10 based on the received steering control signal. The brake actuator 11 is configured to receive the brake control signal from the vehicle control unit 3 and control the brake device 12 based on the received brake control signal. The accelerator actuator 13 is configured to receive the accelerator control signal from the vehicle control unit 3 and control the accelerator device 14 based on the received accelerator control signal. As described, in these modes, the traveling of the vehicle 1 is automatically controlled by the vehicle system 2.

On the other hand, when the vehicle 1 travels in the driving support mode or the fully manual driving mode, the vehicle control unit 3 generates a steering control signal, an accelerator control signal, and a brake control signal, in accordance with a manual operation of the driver with respect to the steering wheel 15 (see FIG. 4), an accelerator pedal (not illustrated), and a brake pedal (not illustrated). As described, in these modes, since the steering control signal, the accelerator control signal, and the brake control signal are generated in accordance with the manual operation of the driver, the traveling of the vehicle 1 is controlled by the driver.

Next, a configuration of the vehicle communication system 20 will be described. As illustrated in FIG. 3, the vehicle communication system 20 includes a front composite system 100 disposed at a front portion of the vehicle 1, a rear composite system 200 disposed at a rear portion of the vehicle 1, and a system control unit 25 that controls the front composite system 100 and the rear composite system 200.

The system control unit 25 is connected to the vehicle control unit 3, and is configured to control operations of the front composite system 100 and the rear composite system 200 based on signals transmitted from the vehicle control unit 3. The system control unit 25 is constituted by, for example, at least one electronic control unit (ECU). The electronic control unit may include at least one microcontroller including one or more processors and one or more memories, and another electronic circuit including an active element such as a transistor and a passive element.

As illustrated in FIG. 3, the front composite system 100 includes an external sensor 110 (an example of an environment information acquisition unit), a lamp unit 120 (an example of a lamp for illumination, display or signal), and a front display 130 (an example of a first display).

The external sensor 110 includes a camera 112, a radar 114, and a LiDAR 116. The camera 112 is, for example, a camera that includes a photographing element such as a charge-coupled device (CCD) or a complementary MOS (CMOS). The camera 112 is a camera that detects visible light or an infrared camera that detects infrared rays. The radar 114 is, for example, a millimeter-wave radar, a microwave radar, or a laser radar. LiDAR 116 is an abbreviation for Light Detection and Ranging or Laser Imaging Detection and Ranging. The LiDAR 116 is a sensor that generally emits non-visible light forward and acquires information such as a distance to an object, a shape of the object, material of the object, a color of the object, and the like based on the emitted light and returned light.

The camera 112, the radar 114, and the LiDAR 116 are configured to detect surrounding environments (other vehicles, pedestrians, road shapes, traffic signs, obstacles, and the like) on a front side and lateral sides of the vehicle 1 and to output detected surrounding environment information to the system control unit 25.

The lamp unit 120 includes a left headlamp 122L, a right headlamp 122R, a decorative lamp 124, and a road surface drawing lamp 126.

The left headlamp 122L and the right headlamp 122R are lamps for illuminating a predetermined region at a front side of the vehicle 1. As the headlamps 122L and 122R, a lamp can be enumerated which is constituted by a light source (not illustrated) for emitting light and a light emitter that guides and emits the light from the light source to the outside of the lamp. As the light source, a lamp light source or a light emitting element can be used. Examples of the lamp light source include an incandescent lamp, a halogen lamp, a discharge lamp, and a neon lamp. Examples of the light emitting element include alight emitting diode, a laser diode, and an organic EL element. The left headlamp 122L and the right headlamp 122R may have a marker function for serving as a display lamp or a signal lamp, such as a position lamp, a daytime running lamp, and a turn signal lamp.

The decorative lamp 124 has a function for transmitting predetermined information to a driver or another traffic vehicle. As the decorative lamp 124, for example, a lamp can be enumerated which is constituted by a lamp light source or a light source formed of a light emitting element, and a light emitting unit formed of a resin molded product which guides and emits light from the light source to the outside of the lamp.

The road surface drawing lamp 126 has a configuration for projecting (emitting) a predetermined drawing pattern on a road surface around the vehicle 1. As the road surface drawing lamp 126, for example, a projector is enumerated. In this example, the road surface drawing lamp 126 can form a predetermined road surface drawing pattern (for example, a road surface drawing pattern P2 of FIG. 8) on the road surface around the vehicle 1.

The rear composite system 200 is constituted by an external sensor 210 (an example of the environment information acquisition unit), a lamp unit 220, a rear display 230 (second display), and a movable portion 240.

The external sensor 210 includes a camera 212 and a LiDAR 216. The camera 212 and the LiDAR 216 are configured to detect a surrounding environment on a rear side of the vehicle 1 and output surrounding environment information to the system control unit 25.

The lamp unit 220 includes a left rear lamp 222L and a right rear lamp 222R. The left rear lamp 222L and the right rear lamp 222R have various functions of a turn signal lamp, a brake lamp, a stop lamp, and a position lamp and the like.

Next, a configuration of the front composite system 100 will be described in detail with reference to FIGS. 4 to 8.

Figure 4:
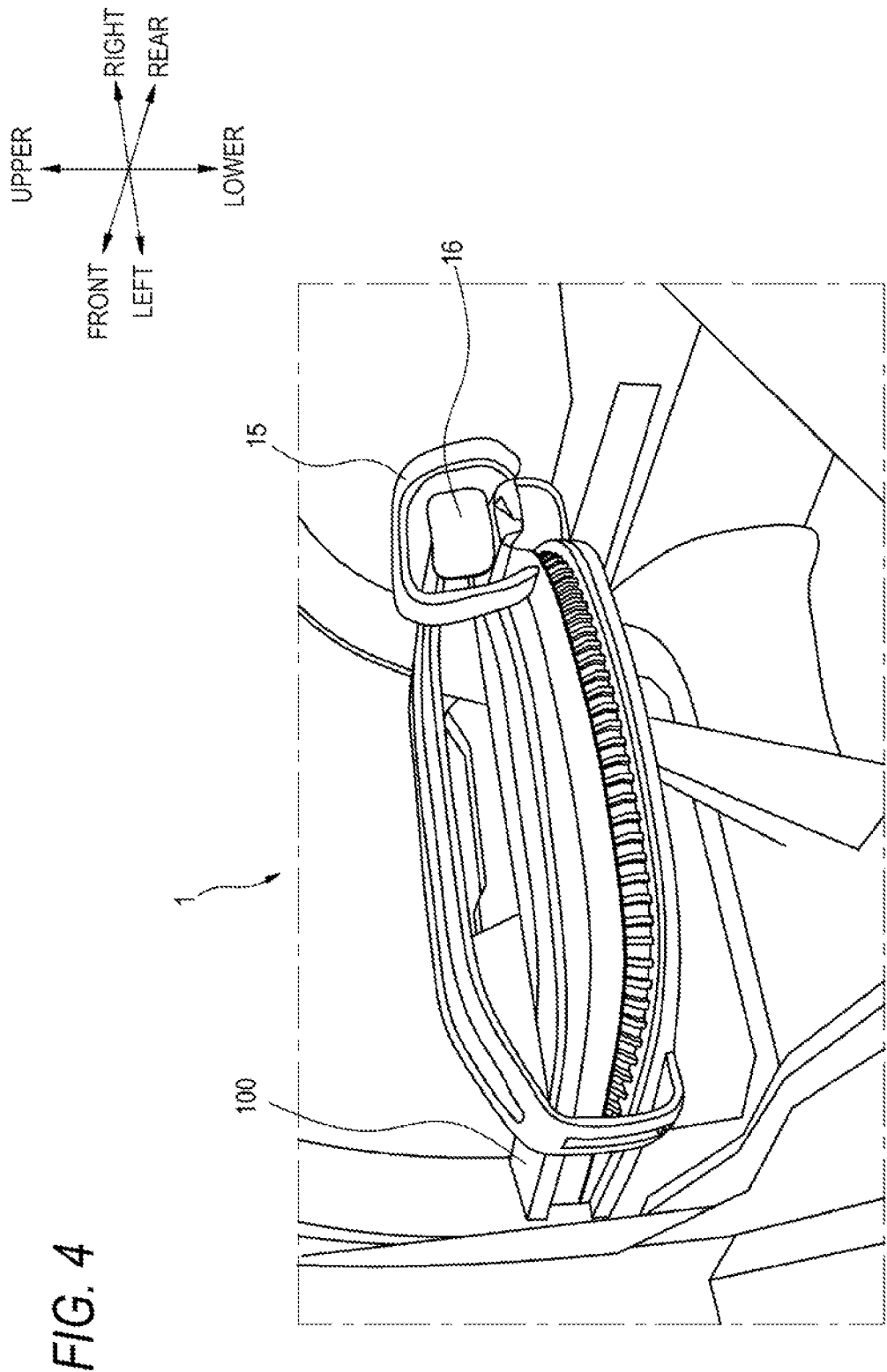
FIG. 4 is a diagram illustrating a vehicle interior of a vehicle 1.
Figure 5:
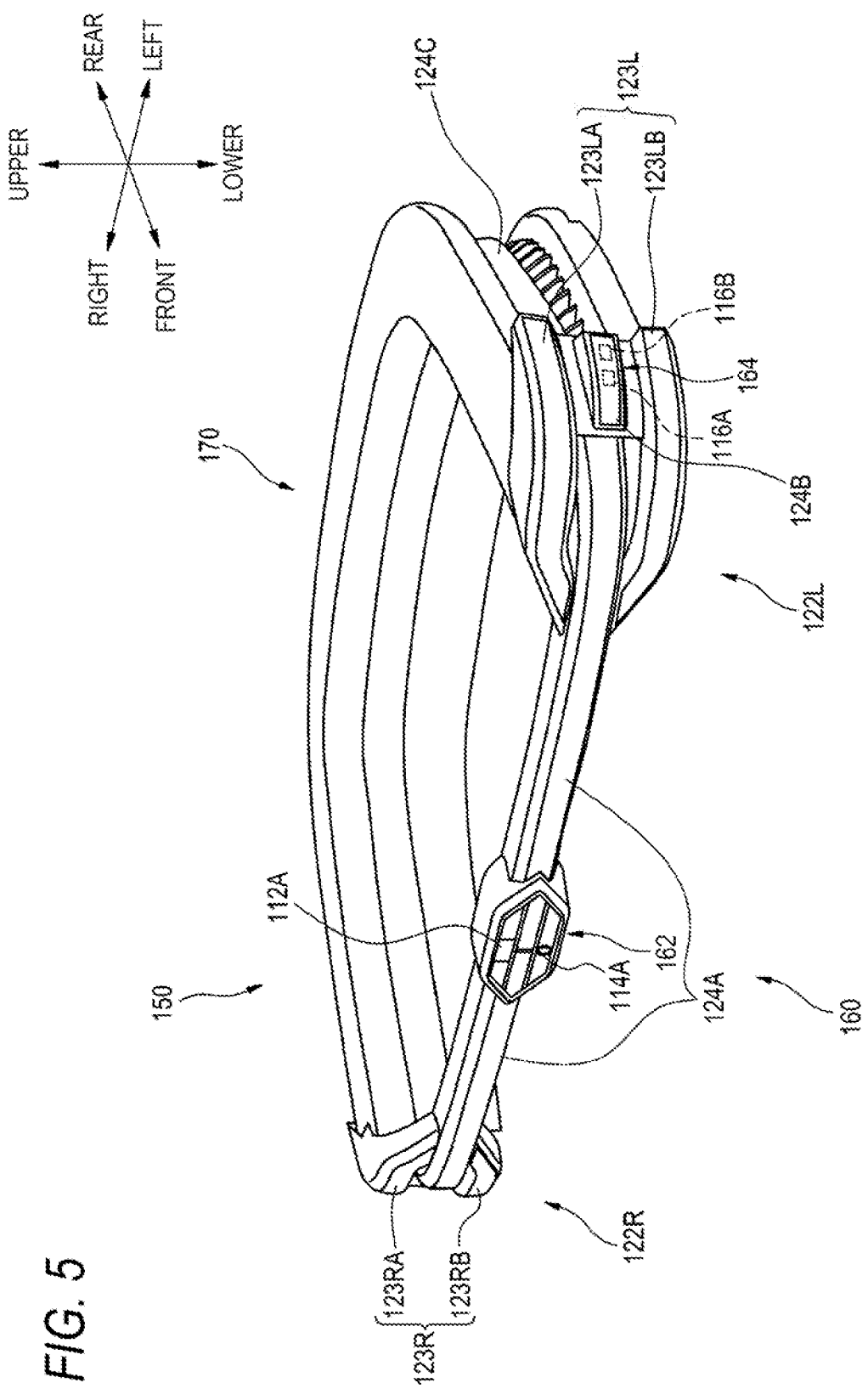
FIG. 5 is a front perspective view of a front module included in a front composite system provided in a vehicle communication system.
Figure 6:
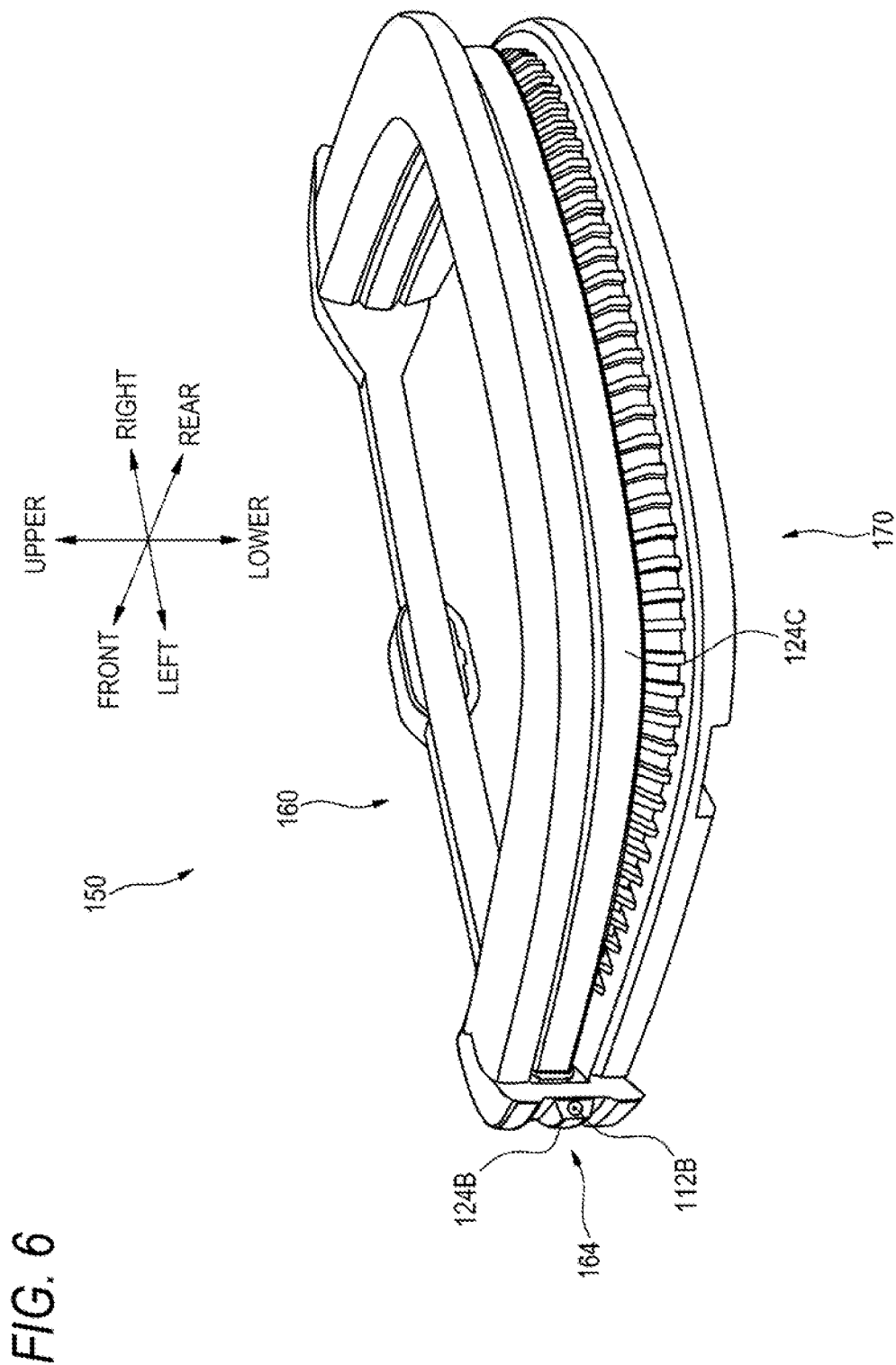
FIG. 6 is a rear perspective view of the front module of FIG. 5.

As illustrated in FIGS. 4 to 6, the front composite system 100 includes an annular front module 150 in which the external sensor 110 and the lamp unit 120 are integrated. The front module 150 is constituted by a curved outer module 160 disposed outside a vehicle interior of the vehicle 1, and a curved inner module 170 disposed inside the vehicle interior of the vehicle 1.

In a central portion in the left-right direction of the outer module 160 (hereinafter, referred to as a central sensor portion 162), a front camera 112A included in the camera 112 and a front radar 114A included in the radar 114, among the external sensor 10, are disposed. The front camera 112A is used to photograph a front side of the vehicle 1 to obtain an image thereof to be displayed on the rear display 230, which will be described below. The front radar 114A is, for example, a millimeter-wave radar, and is used to detect a position of a target object (a traffic person or the like) at a front side of the vehicle 1.

At left and right end portions of the outer module 160, that is, in the vicinity of connection portions with the inner module 170, a protruding portion 164 protruding leftward from a front pillar PL of the vehicle 1 and a protruding portion 164 protruding rightward from a front pillar PR of the vehicle 1 are provided respectively. In each protruding portion 164, a side camera 112B included in the camera 112, and a front LiDAR 116A and a side LiDAR 116B included in the LiDAR 116 are disposed. The side camera 112B is disposed so as to face the outside of the vehicle from a rear end surface of the protruding portion 164, and is used to photograph a rear side of the vehicle 1 to obtain an image thereof and display the image on an in-vehicle display, for example, a steering display 16 (see FIG. 4) in the steering wheel 15. The front LiDAR 116A and the side LiDAR 116B are disposed on a side surface side of the protruding portion 164, and are used to detect a target object (a traffic person or the like) at a front side and a lateral side of the vehicle 1.

The left headlamp 122L is provided at a position intersecting the left front pillar PL (see FIG. 1) of the vehicle 1, which is a left end of the outer module 160. The right headlamp 122R is provided at a position intersecting the right front pillar PR (see FIG. 1) of the vehicle 1, which is a right end of the outer module 160. The left headlamp 122L is constituted by, for example, a light source (not illustrated), and a light emitting unit 123L formed of a resin molded product for guiding light from the light source and emitting the light to the front side of the vehicle in a predetermined light distribution pattern. The light emitting unit 123L is constituted by an upper light emitting unit 123LA disposed on an upper side and a lower light emitting unit 123LB disposed on a lower side. The right headlamp 122R is constituted by, for example, a light source (not illustrated) and a light emitting unit 123R formed of a resin molded product for guiding light from the light source and emitting the light to the front side of the vehicle in a predetermined light distribution pattern. The light emitting unit 123R is constituted by an upper light emitting unit 123RA disposed on an upper side and a lower light emitting unit 123RB disposed on a lower side. The upper light emitting units 123LA and 123RA and the lower light emitting units 123LB and 123 RB exert functions of a so-called high beam lamp and a so-called low beam lamp.

The decorative lamp 124 includes an external decorative lamp 124A, aside decorative lamp 124B, and an internal decorative lamp 124C.

The external decorative lamp 124A is formed to extend leftward and rightward from the central sensor portion 162 in which the front camera 112A and the front radar 114A are disposed, and left and right ends thereof are respectively disposed between the upper light emitting unit 123LA and the lower light emitting unit 123LB of the left headlamp 122L, and between the upper light emitting unit 123RA and the lower light emitting unit 123RB of the right headlamp 122R. The external decorative lamp 124A is constituted by, for example, a plurality of light sources (not illustrated) arranged at predetermined intervals and a light emitting unit that guides light emitted from the plurality of light sources. By causing the entire or a part of the external decorative lamp 124A thus configured to emit light based on a control signal from the system control unit 25, it is possible to form a seamless light emitting pattern continuous with the left and right headlamps 122L and 122R.

The side decorative lamp 124B is disposed on aside surface of the protruding portion 164. The side decorative lamp 124B is constituted by, for example, a plurality of light sources (not illustrated) arranged at predetermined intervals and a light emitting unit that guides light emitted from the plurality of light sources. By causing the side decorative lamp 124B to emit light based on a control signal from the system control unit 25, it is possible to form a light emitting pattern linked with the left and right headlamps 122L and 122R and the external decorative lamp 124A. The side decorative lamp 124B may have a function of a position lamp, a daytime running lamp, a turn signal lamp, or the like.

The internal decorative lamp 124C is disposed along a curved shape of the inner module 170 at a central portion in the upper-lower direction of the inner module 170. The internal decorative lamp 124C is used to transmit vehicle information and surrounding environment information to a user in the vehicle. The internal decorative lamp 124C is constituted by, for example, a plurality of light sources (not illustrated) arranged at predetermined intervals and a light emitting unit that guides light emitted from the plurality of light sources. The internal decorative lamp 124C is preferably configured to be capable of emitting light in various colors and light emitting patterns, based on a control signal from the system control unit 25. By causing the internal decorative lamp 124C to emit light in a predetermined light emitting pattern, for example, it is possible to notify the user in the vehicle of information such as a notice of departure and stop during automated driving, or a sign at the time of finding an acquaintance outside the vehicle.

Figure 7:
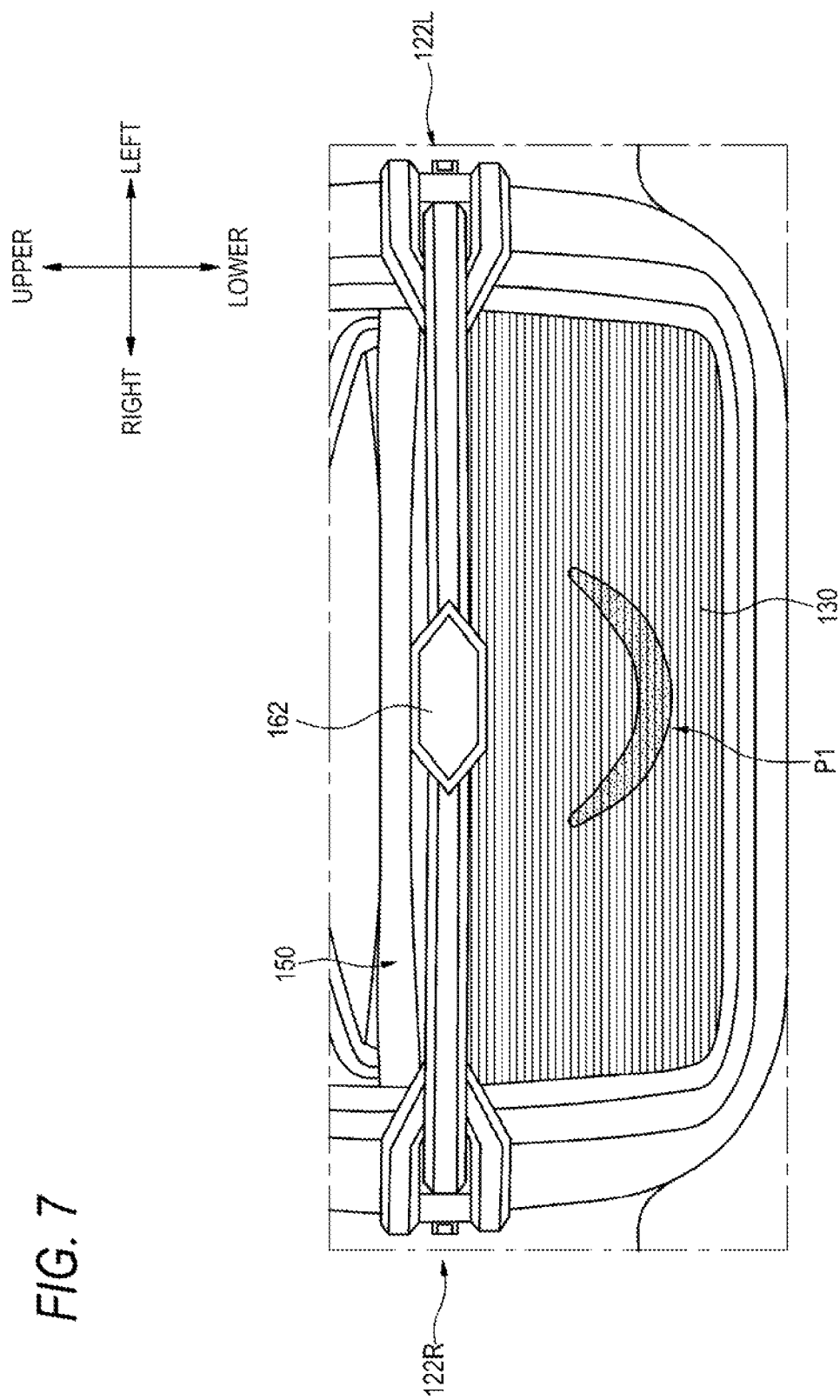
FIG. 7 is a front view of a front composite system.

As illustrated in FIG. 7, the front display 130 is disposed on a lower side of the front module 150. The front display 130 is constituted by a planar light emitter having an information display function. The front display 130 is constituted by, for example, a plurality of ribbon-shaped organic electroluminescent elements (organic EL elements) provided in parallel. The organic EL element is capable of emitting light spontaneously because of an organic light emitting material, and color development of various colors derived from the organic light emitting material is obtained.

Various kinds of information (for example, vehicle information) can be displayed on the front display 130 based on a control signal from the system control unit 25. For example, the system control unit 25 can cause the front display 130 to display a pattern P1 having a shape imitating a human mouth as illustrated in FIG. 7 while turning on the left and right headlamps 122L and 122R. With such a turning-on pattern, the headlamps 122L and 122R correspond to human eyes, the central sensor portion 162 of the front module 150 corresponds to a human nose, and the pattern P1 corresponds to a human mouth. As described, by combining light emission of the headlamps 122L and 122R with information display of the front display 130, feelings of the vehicle 1 (for example, a smiling face as illustrated in FIG. 7) can be presented as the vehicle information.

The vehicle information presented by at least one of the lamp unit 120 and the front display 130 is not limited to the presentation of feelings, and includes various kinds of information indicating a condition of the vehicle. For example, the system control unit 25 may be configured to present information for indicating that the vehicle 1 is executing an automated driving mode, by a combination of the lamp unit 120 and the front display 130 or by one of the lamp unit 120 and the front display 130. For example, it is possible to present on the front display 130 that the vehicle 1 is executing an automated driving mode while turning on the decorative lamp 124 in a predetermined light emitting pattern. In addition, at least one of the lamp unit 120 and the front display 130 may present notice information of departure and stop during the automated driving.

Figure 8:
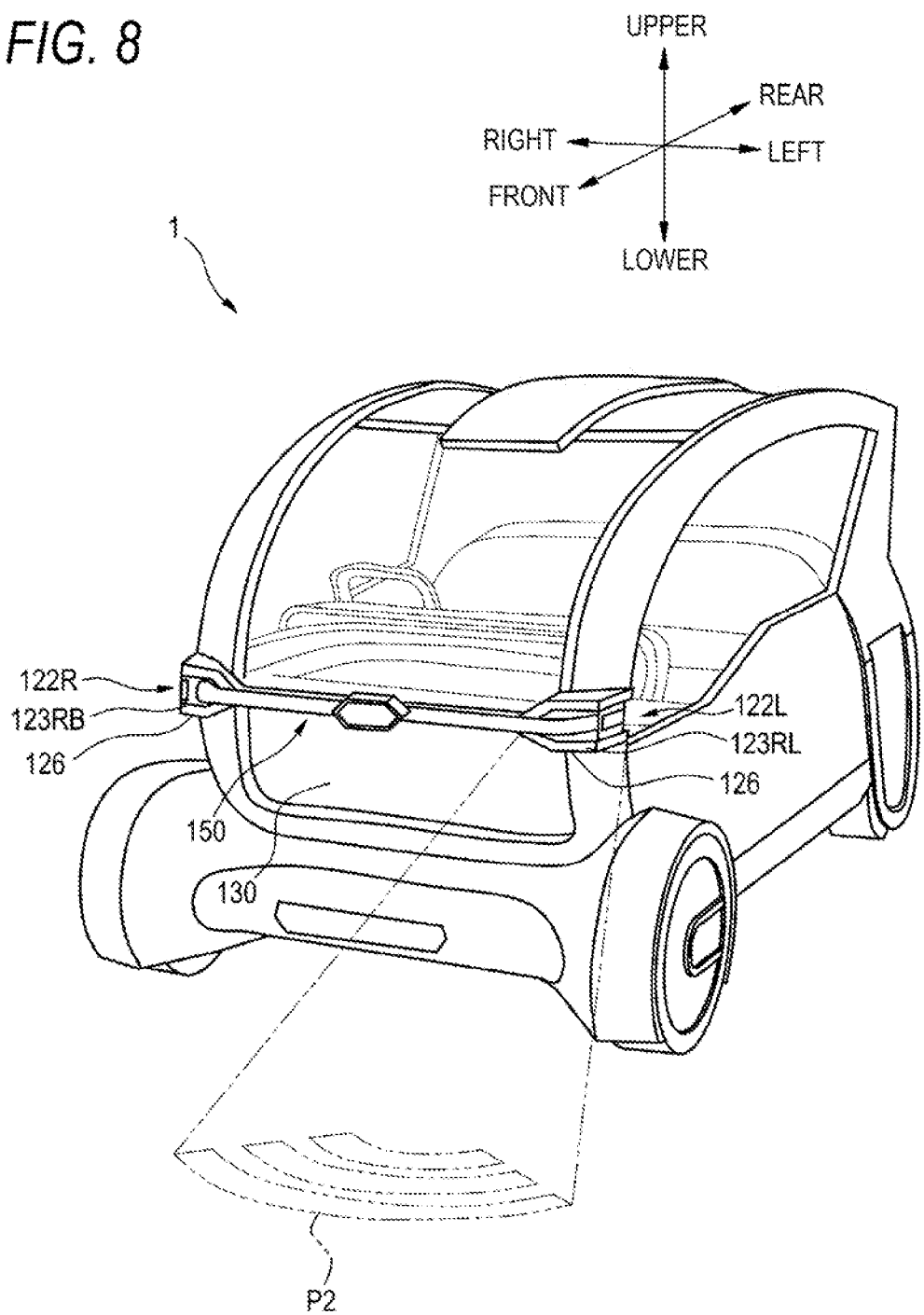
FIG. 8 is a diagram illustrating an example of a road surface drawing lamp provided in a front composite system, and an example of a road surface drawing pattern drawn on a road surface by the road surface drawing lamp.

As illustrated in FIG. 8, the road surface drawing lamp 126 is disposed on a lower side of each of the lower light emitting units 123LB and 123RB of the left and right headlamps 122L and 122R. The road surface drawing lamp 126 can project a predetermined road surface drawing pattern P2 onto a road surface at the front side of the vehicle 1 based on a control signal from the system control unit 25. The road surface drawing pattern P2 is used to present a traveling direction, a start cue, and the like of the vehicle 1 by light and alert the condition of the vehicle 1 to the surroundings. The road surface drawing lamp 126 may be configured to form a predetermined road surface drawing pattern based on the surrounding environment information detected by the external sensor 110.

Next, a configuration of the rear composite system 200 will be described in detail with reference to FIGS. 9 to 16.

Figure 9:
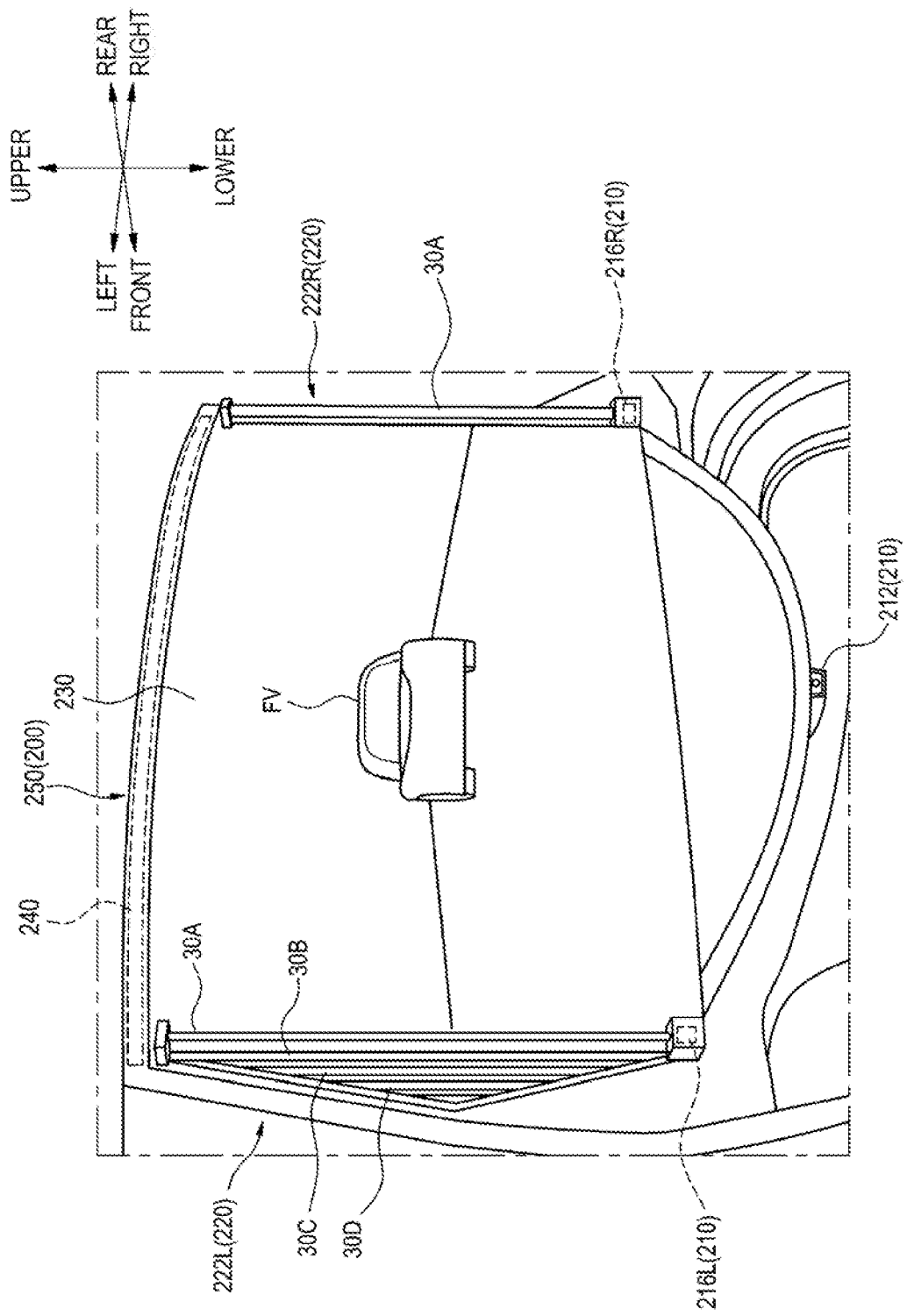
FIG. 9 is a perspective view of a rear composite system (rear module) provided in a vehicle communication system.

As illustrated in FIG. 9, the rear composite system 200 is constituted by a rear module 250 (an example of a vehicle module) in which the external sensor 210, the lamp unit 220, the rear display 230, and the movable portion 240 are integrated.

The movable portion 240 is provided on an upper end surface of the rear module 250, for example. As the movable portion 240, for example, a hydraulic or pneumatic hinge mechanism or a slide mechanism can be employed. The rear module 250 may be moved manually or automatically via the movable portion 240 so as to swing upward like a so-called "hatchback" type back door. That is, the rear module 250 can be opened and closed by a user and can be opened and closed based on a control signal from the system control unit 25. A movable range of the rear module 250 by the movable portion 240 can be optionally set. For example, in an initial state, the rear module 250 is set at a position such that a normal line of the rear display 230 is in a direction along the front-rear direction of the vehicle 1. Configuration and arrangement of the movable portion 240 are not limited to this example. For example, the movable portion may be provided on one of the left and right sides of the rear module, and the rear module may be configured to be opened and closed with a sideway opening type.

The rear display 230 is a horizontally long rectangular display disposed at a central portion of the rear module 250.

Figure 10:
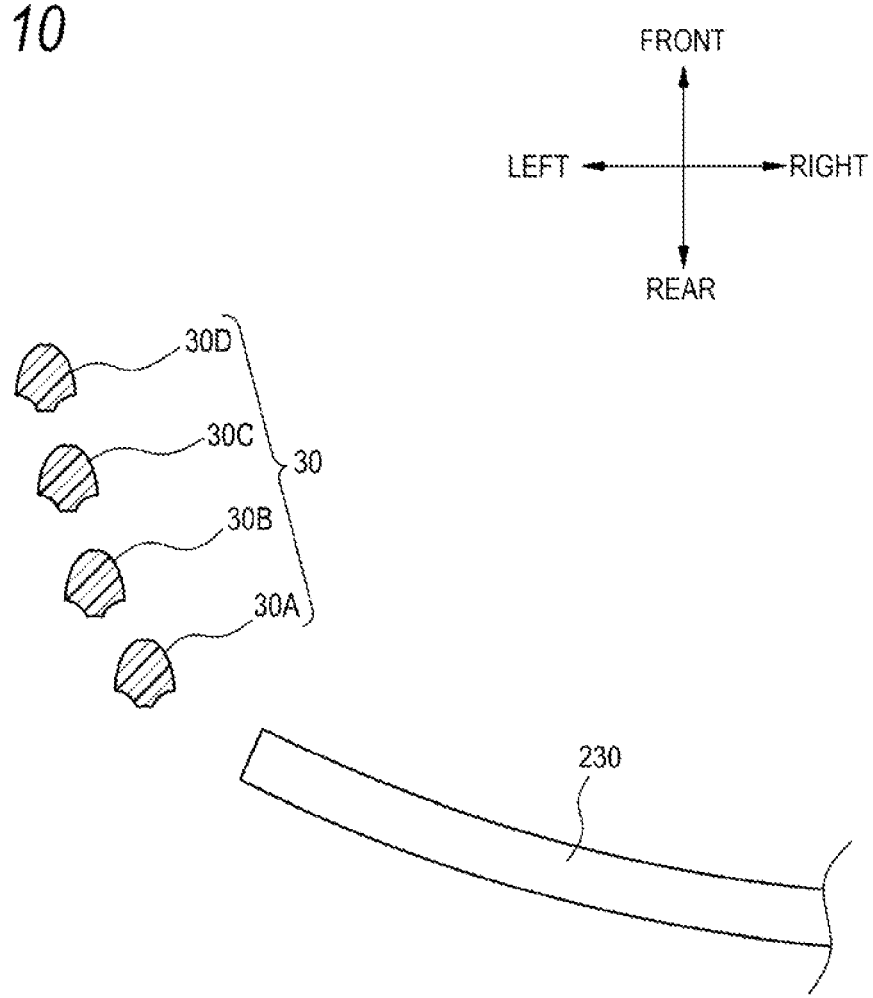
FIG. 10 is a partially enlarged cross-sectional view of a rear module.

The rear display 230 is disposed on a rear surface side of the vehicle 1 so as to cover substantially an entire portion that corresponds to a portion in a related-art vehicle where a rear glass is disposed. The rear display 230 is constituted by a planar light emitter having an information display function. The rear display 230 is not particularly limited as long as being a thin display, and an organic EL display or a liquid crystal display can be suitably used. As illustrated in FIGS. 9 and 10, the rear display 230 is preferably formed to have a curved shape in the left-right direction of the vehicle 1.

On the rear display 230, an image of the front side of the vehicle 1, which is photographed by the front camera 112A disposed at the central portion of the outer module 160 of the front module 150, is displayed. As illustrated in FIG. 9, for example, an image of a preceding vehicle FV of the vehicle 1 can be displayed on the rear display 230.

A rear camera 212 serving as the camera 212 is disposed at a lower portion of the rear display 230. The rear camera 212 is used to photograph a rear side of the vehicle 1 to obtain an image thereof and display the image on the steering display 16 in the vehicle interior. Further, rear LiDARs 216L and 216R serving as the LiDAR 216 are respectively disposed in lower portions of left and right ends of the rear display 230 (that is, lower portions of the left and right rear lamps 222L and 222R to be described below). The rear LiDARs 216L and 216R are used to detect a target object (a traffic person or the like) at the rear side of the vehicle 1.

The left rear lamp 222L is disposed on a left side of the rear display 230. The right rear lamp 222R is disposed on a right side of the rear display 230. The left rear lamp 222L and the right rear lamp 222R have various functions of a turn signal lamp, a brake lamp, a stop lamp, and a position lamp and the like. Since the right rear lamp 222R has a bilaterally symmetric configuration with the left rear lamp 222L, the configuration of the left rear lamp 222L will be representatively described below.

The left rear lamp 222L and the right rear lamp 222R each include alight emitter 30 for emitting light to the rear side of the vehicle 1, and a light source 40 (see FIG. 11) for emitting light into the light emitter 30.

The light emitter 30 is constituted by a plurality of light guides 30A to 30D formed of a resin molded product. As illustrated in FIGS. 9 and 10, the light guides 30A to 30D are arranged in parallel in the left-right direction such that longitudinal directions thereof are along the upper-lower direction of the vehicle 1. The light guides 30A to 30D are preferably arranged on an extension line of the curved shape of the rear display 230.

The plurality of light guides 30A to 30D are configured such that lengths thereof are different from each other. Specifically, among the plurality of light guides 30A to 30D, the light guide 30A disposed closest to the rear display 230 is the longest, and lengths thereof decrease as the light guides get away from the rear display 230.

Figure 11:
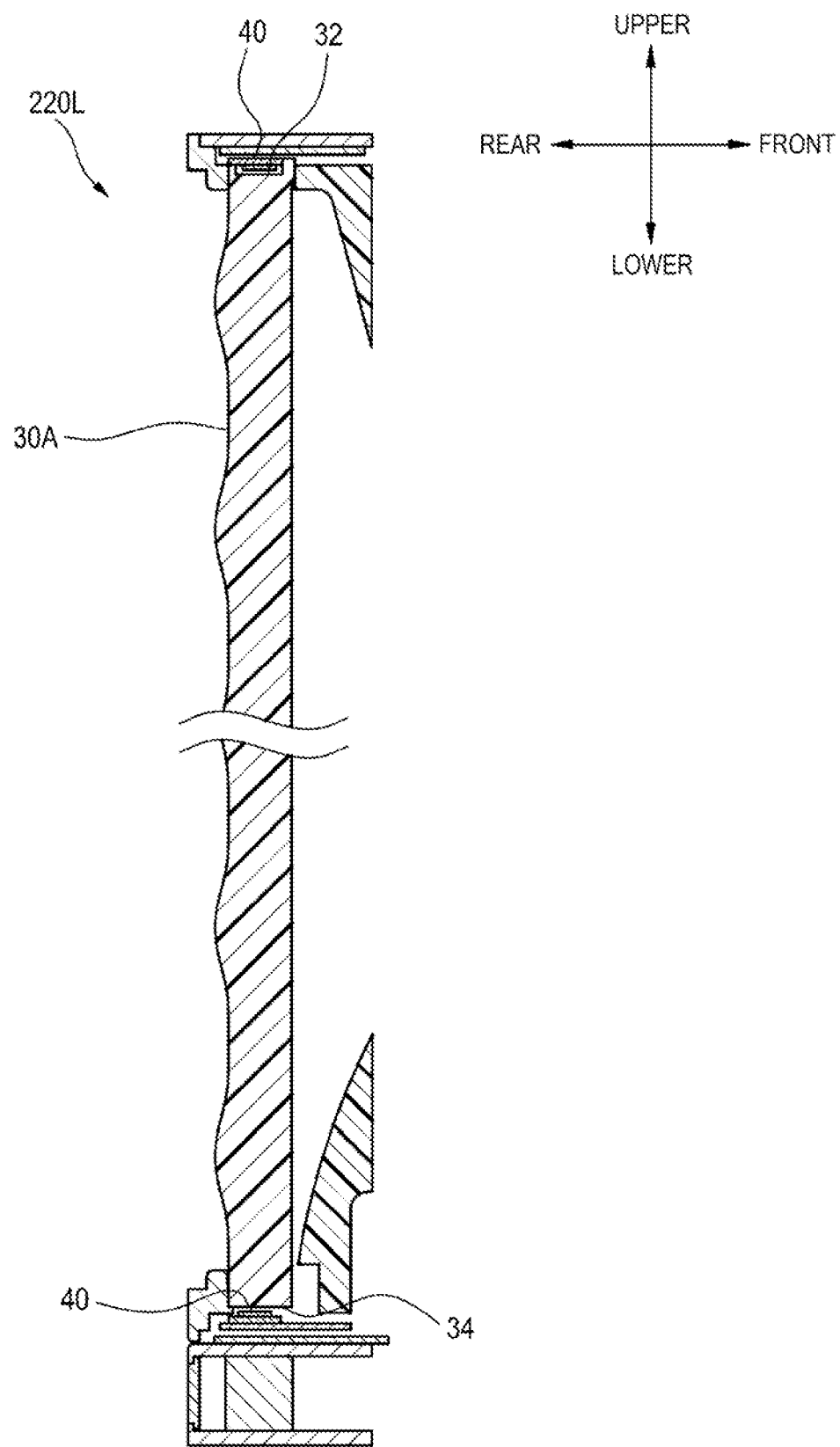
FIG. 11 is a longitudinal sectional view of a light emitter constituting a left rear lamp provided in a rear module.

FIG. 11 is a partially omitted longitudinal sectional view of the light guide 30A and of the light source 40 corresponding to the light guide 30A. Since the plurality of light guides 30A to 30D have the same configuration except that the lengths thereof are different from each other, the light guide 30A adjacent to the rear display 230 and the light source 40 corresponding to the light guide 30A will be representatively described below.

As illustrated in FIG. 11, the light source 40 is disposed at each of positions facing an upper end surface 32 and a lower end surface 34 of the light guide 30A. Since a configuration of the light source 40 on an upper end surface 32 side and a configuration of the light source 40 on a lower end surface 34 side are the same, the light source 40 on the upper end surface 32 side will be representatively described below.

Figure 12:
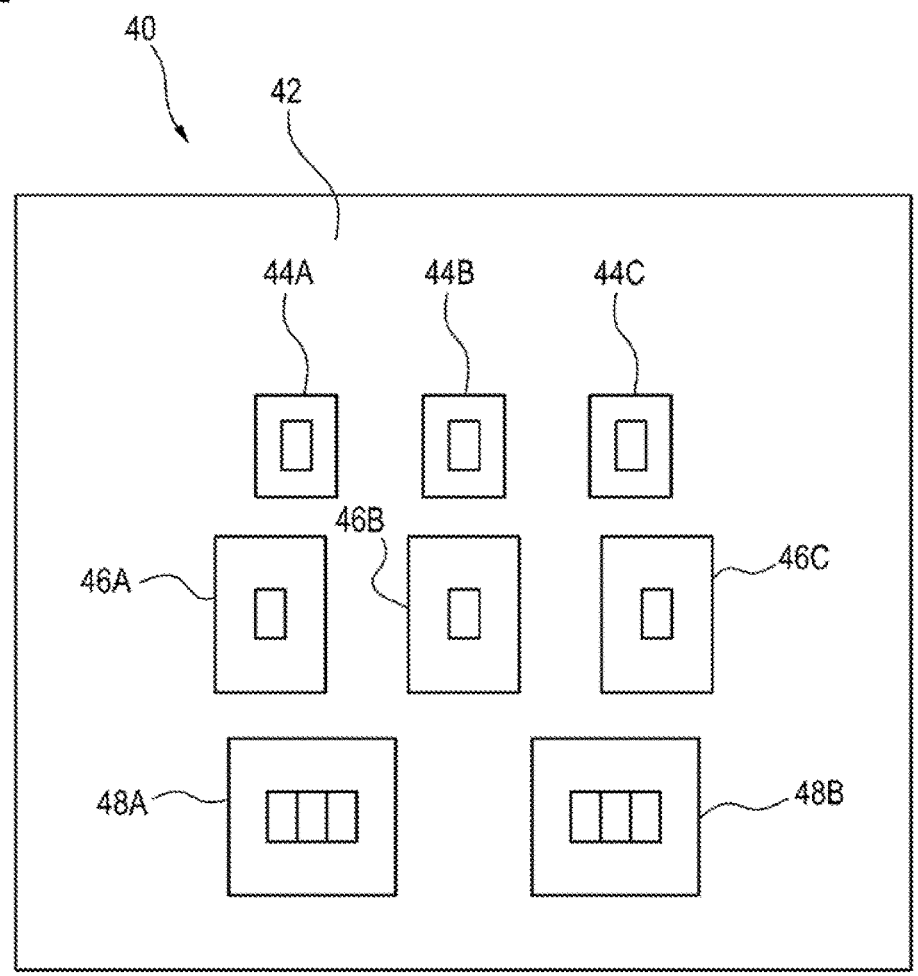
FIG. 12 is a diagram illustrating a light source of a left rear lamp.

As illustrated in FIG. 12, the light source 40 is constituted by a substrate 42, and a plurality of light emitting units 44A to 44C, 46A to 46C, 48A, and 48B which are installed on the substrate 42. Among these light emitting units, the first light emitting units 44A to 44C have light emitting elements that emit light in amber. The second light emitting units 46A to 46C have light emitting elements that emit light in red. The third light emitting units 48A and 48B have light emitting elements that emit light in colors of RGB. In this example, three first light emitting units 44A to 44C are arranged in parallel in a left-right direction of the substrate 42, three second light emitting units 46A to 46C are arranged on a lower side of the first light emitting units 44A to 44C and are arranged in parallel in the left-right direction of the substrate 42, and two third light emitting units 48A and 48B are arranged on a lower side of the second light emitting units 46A to 46C and are arranged in parallel in the left-right direction of the substrate 42. Turning-on and turning-off of the light emitting element in each light emitting unit is controlled by the system control unit 25. That is, each of the light guides 30A to 30D is configured to be capable of emitting light in colors such as amber, red, or white based on a control signal from the system control unit 25. The number and arrangement of the first light emitting units 44A to 44C, the second light emitting units 46A to 46C, and the third light emitting units 48A and 48B are not limited to this example.

Figure 13:
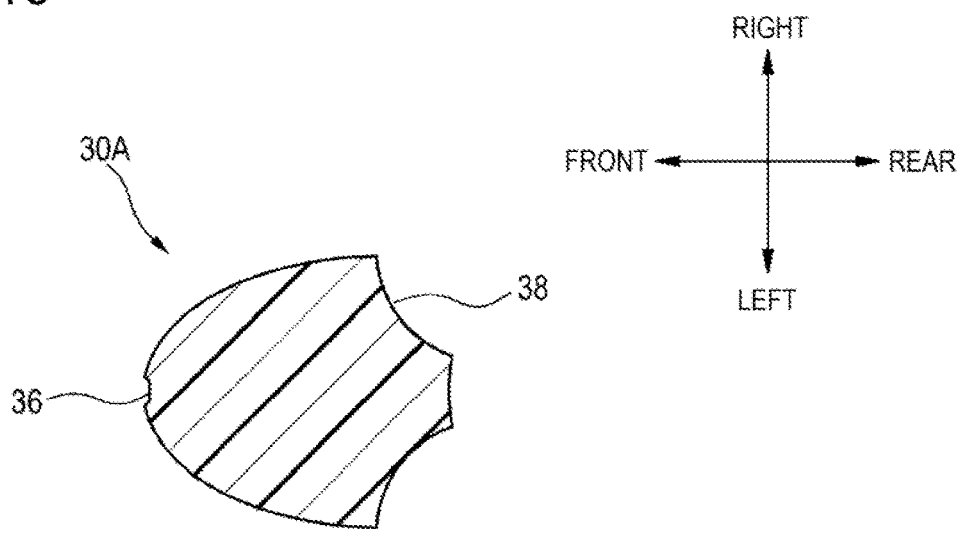
FIG. 13 is a cross-sectional view of a light guide constituting the light emitter of FIG. 11.

FIG. 13 is a cross-sectional view of the light guide 30A.

As illustrated in FIG. 13, a total reflection step 36 is formed on a front end side (back surface side) of the light guide 30A. A step 38 for forming a desired light distribution is formed on a rear end side (front side) of the light guide 30A. In addition, a diffusion material for diffusing light emitted from the light source 40 is dispersed in the entire light guide 30A. As the diffusion material, for example, titanium dioxide particles can be enumerated.

Light emitted from the light emitting elements of the first light emitting units 44A to 44C, the second light emitting units 46A to 46C, and the third light emitting units 48A and 48B of the light source 40 enters the light guide 30A from the upper end surface 32 and the lower end surface 34 of the light guide 30A, and a part of the light is totally reflected by the step 36 on a front end surface side of the light guide 30A. The light entering the light guide 30A from the upper end surface 32 and the lower end surface 34 and the light totally reflected by the step 36 is diffused by the diffusion material dispersed in the entire light guide 30A. Further, the diffused light is refracted by the step 38 on the rear end side of the light guide 30A and is emitted to the outside of the light guide 30A. In this way, the entire light guide 30A emits light uniformly.

Figure 14:
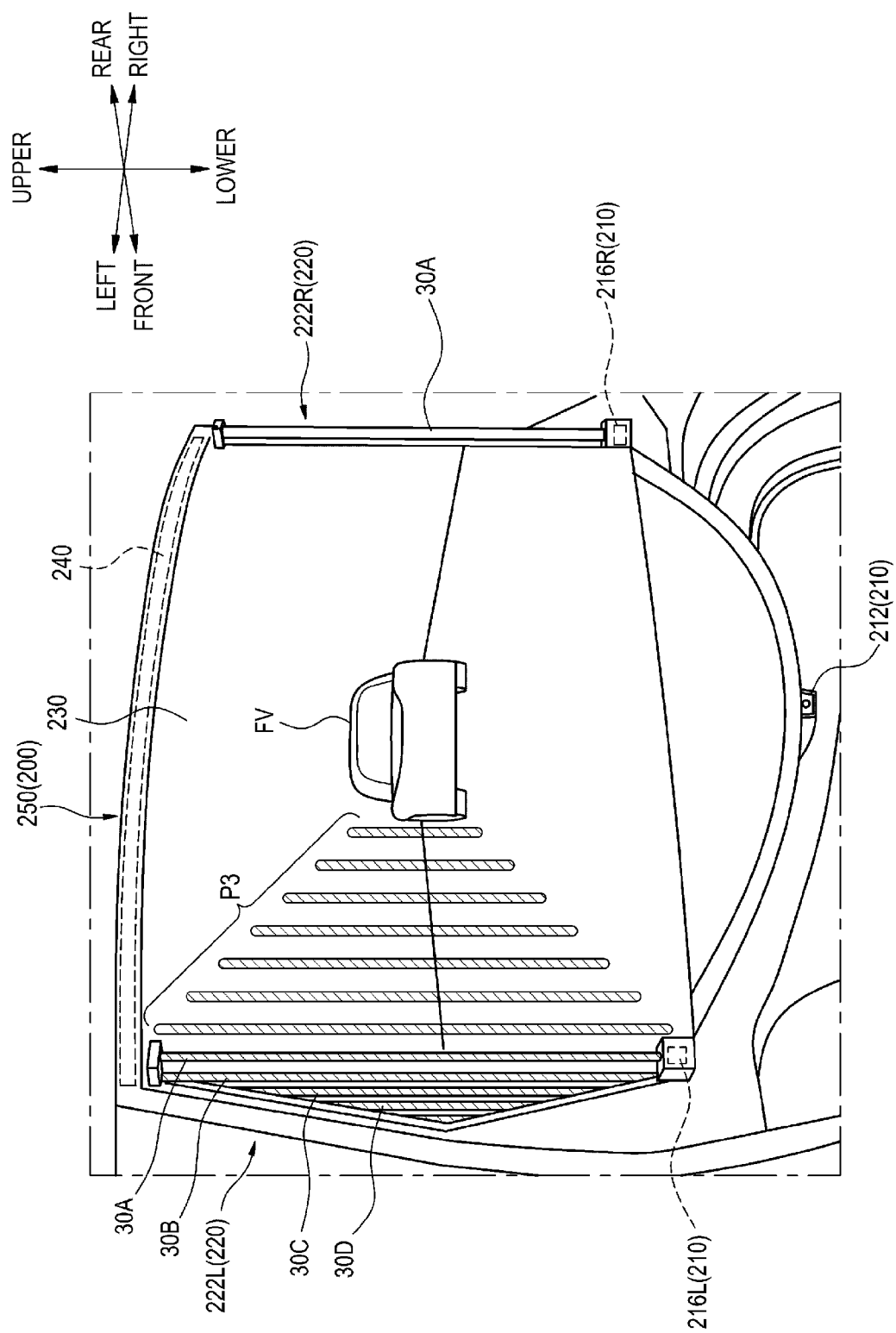
FIG. 14 is a diagram illustrating an example of a display pattern of a rear display provided in a rear module and an example of a light emitting pattern of a rear lamp.

FIG. 14 is a diagram illustrating an example of a display pattern of the rear display 230 provided in the rear module 250 and an example of a light emitting pattern of the left rear lamp 222L.

For example, when the vehicle 1 is about to turn to a left direction, a direction indication signal is output from the vehicle control unit 3 to the system control unit 25. Based on the direction indication signal, the system control unit 25 displays a pattern P3 on the rear display 230 as illustrated in FIG. 14. The pattern P3 includes a plurality of long patterns extending in the upper-lower direction (preferably the same shape as that of the light guides 30A to 30D), and the plurality of long patterns are arranged in parallel from the vicinity of a central portion to a left end of the rear display 230.

The system control unit 25 turns on the plurality of light guides 30A to 30C, which constitute the left rear lamp 222L, in linkage with the pattern P3. Specifically, the pattern P3 is preferably displayed in a stepwise manner from the vicinity of the central portion toward the left end of the rear display 230, and the plurality of light guides 30A to 30D are preferably turned on in a stepwise manner from one adjacent to the rear display 230 toward a left side. As described, for example, by controlling the pattern display on the rear display 230 and the light emission of the left and right rear lamps 222L and 222R in a linked manner, the rear module 250 can exert a function of serving as a turn signal lamp. By controlling the rear display 230 and the rear lamps 222L and 222R in a linked manner, not only the function of serving as a turn signal lamp but also other functions (such as serving as a tail and stop lamp) provided in a related-art rear combination lamp can be exerted by the rear module 250.

Figure 15:
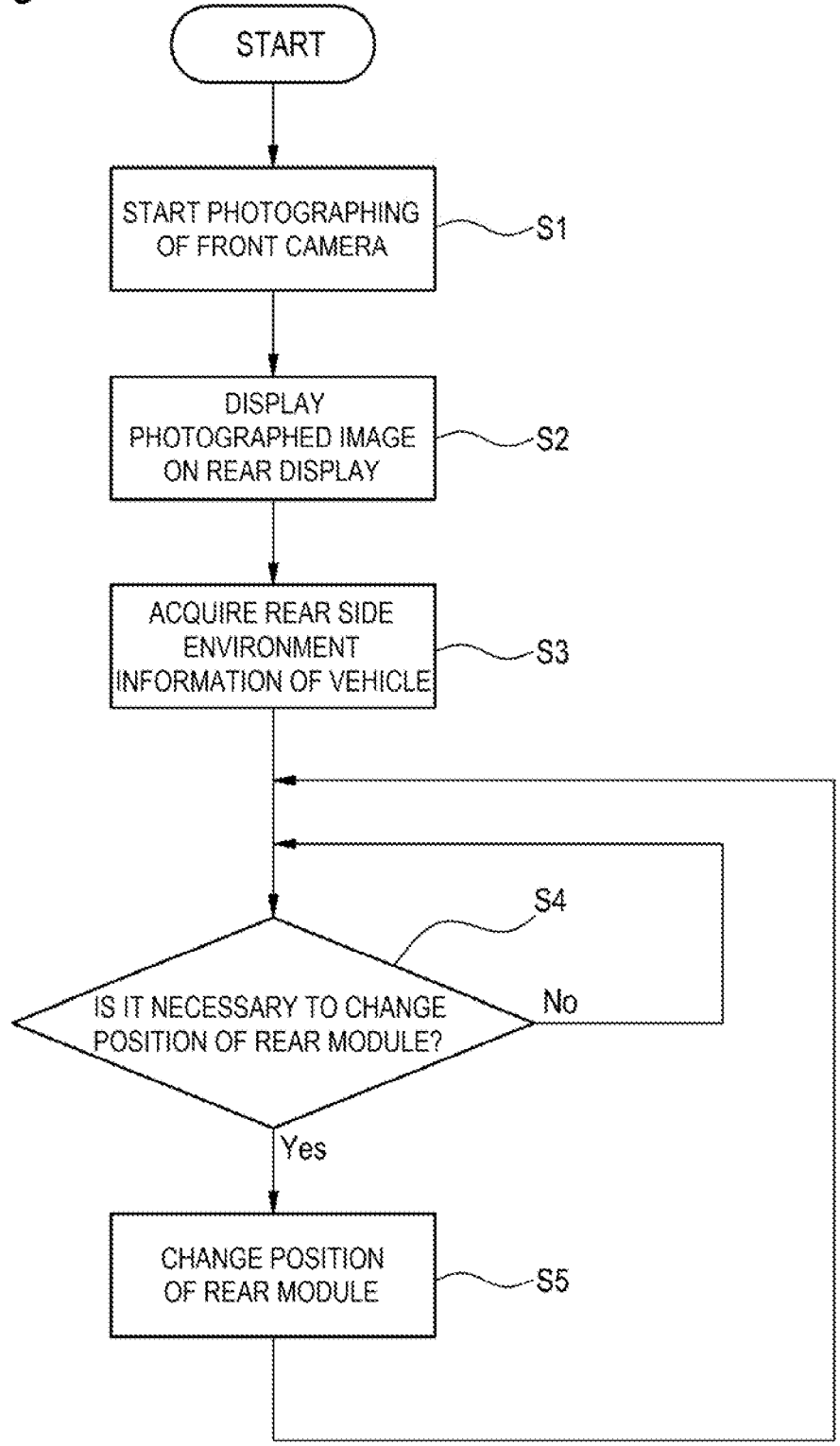
FIG. 15 is a flowchart for illustrating a position change operation for a rear module.
Figure 16:
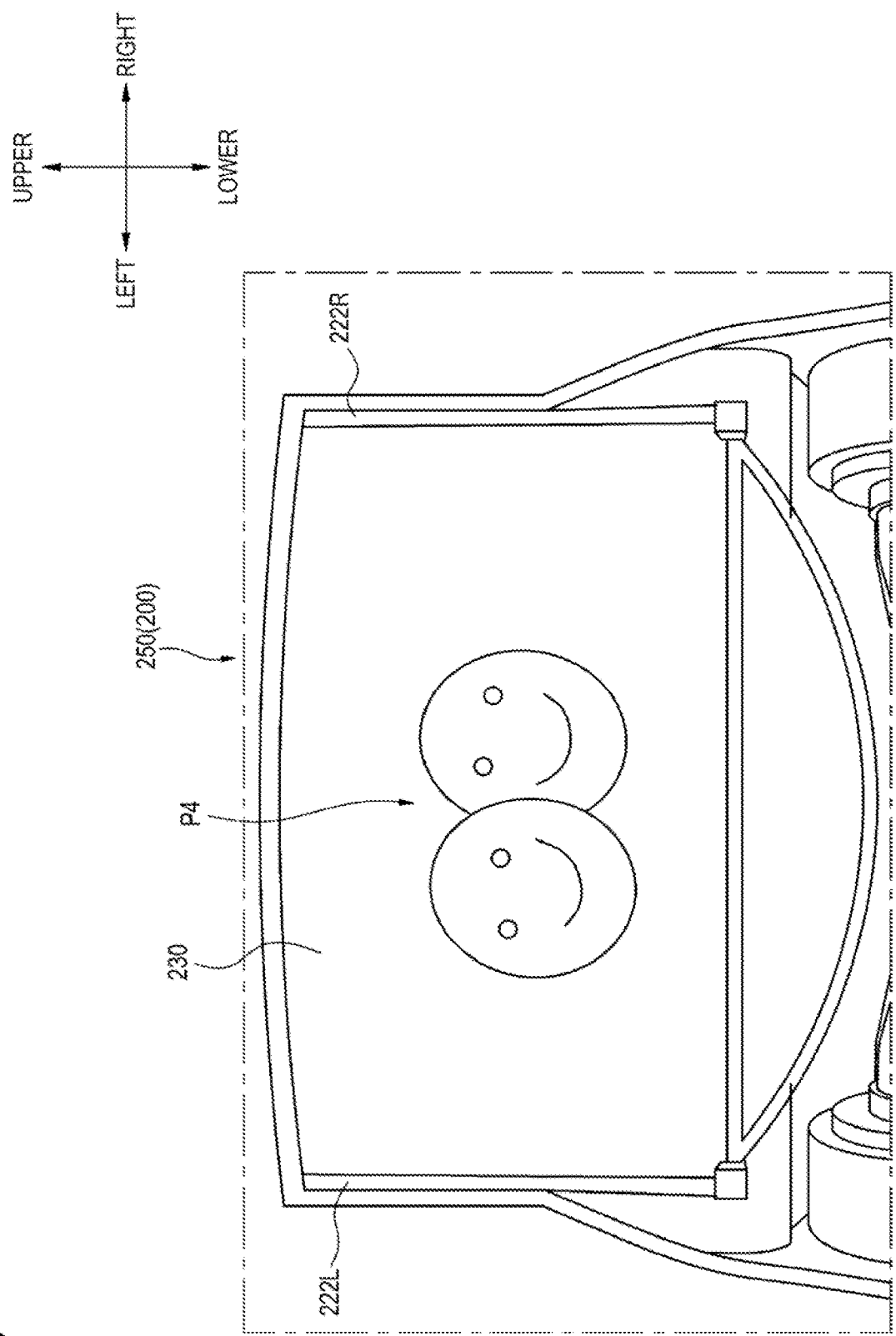
FIG. 16 is a diagram illustrating another example of a display pattern of the rear display of FIG. 14.

Next, an operation of the system control unit 25 for automatically changing a position of the rear module 250 will be described with reference to a flowchart of FIG. 15. First, when ignition of the vehicle 1 is turned on, that is, at the time of activation of the vehicle control unit 3 and the system control unit 25, the system control unit 25 starts photographing with the front camera 112A (step S1). Next, the system control unit 25 transmits image data photographed with the front camera 112A to the rear display 230, and displays an image of the front side of the vehicle 1 on the rear display 230 (step S2). The image of the front side of the vehicle which is displayed on the rear display 230 is used to notify, a following vehicle of the vehicle 1 or a pedestrian at a rear side of the vehicle 1, of a state on a front side of the vehicle 1.

Next, the system control unit 25 acquires rear side environment information of the vehicle 1 from the rear camera 212 provided on a lower side of the rear display 230 and the rear LiDARs 216L and 216R (step S3). In addition to the information acquired from the rear camera 212 and the rear LiDARs 216L and 216R, the system control unit 25 may add information acquired from the side camera 112B or the side LiDAR 116B installed on the front module 150.

Next, the system control unit 25 determines, based on the rear side environment information of the vehicle which is acquired from the rear camera 212 or the rear LiDARs 216L and 216R, whether it is necessary to change the position of the rear module 250 (step S4). A case where it is necessary to change the position of the rear module 250 includes, for example, a case where a following vehicle of the vehicle 1 is a vehicle (large truck or the like) that is tall in vehicle height. Specifically, the system control unit 25 determines a position of a driver of the following vehicle based on the acquired environment information, and when the position of the driver is equal to or greater than a predetermined height, determines that it is necessary to tilt the rear module 250 obliquely upward.

As described, if it is determined that it is necessary to change the position of the rear module 250 (Yes in step S4), the system control unit 25 controls the movable portion 240 to change the position of the rear module 250 (step S5). Specifically, the system control unit 25 controls the movable portion 240 so as to tilt the rear module 250 obliquely upward according to the position (height position) of the driver of the following vehicle. After the position of the rear module 250 is changed, the process returns to step S4.

As described above, the vehicle communication system 20 of the present embodiment includes the lamp units 120 and 220, the displays 130 and 230, and the system control unit 25 that is capable of controlling turning-on of the lamp units 120 and 220 and of the displays 130 and 230. Further, the system control unit 25 is configured to control the lamp units 120 and 220 and the displays 130 and 230 in a linked manner, and present the vehicle information indicating the condition of the vehicle 1 by combining the light emission of the lamp units 120 and 220 with the information display of the displays 130 and 230. According to such a vehicle communication system 20, since the vehicle information can be provided to the traffic person by an integral presentation of the lamp units 120 and 220 and the displays 130 and 230, communication between the vehicle 1 and the traffic person can be established. Accordingly, smooth traffic in a traffic society can be realized.

In addition, the system control unit 25 may be configured to present a human facial expression as the vehicle information by turning on the headlamps 122L and 122R and causing the front display 130 to display a pattern of shape imitating a human mouth. In this way, the system control unit 25 can present a facial expression (a smiling face or the like) as the vehicle information. Accordingly, for example, when the traffic person is an acquaintance of the user in the vehicle 1, the communication between the vehicle 1 and the traffic person can be promoted by presenting an imitated smiling face using the headlamps 122L and 122R and the front display 130.

In addition, the system control unit 25 may be configured to control the information display of the rear display 230 and the turning-on of the rear lamps 222L and 222R in a linked manner to exert a predetermined marker function. As described, by causing the rear lamps 222L and 222R to cooperate with the rear display 230, various kinds of marker functions (for example, a turn signal lamp, a tail and stop lamp, and the like) can be effectively exerted by the rear module 250.

In addition, the vehicle communication system 20 may further include the external sensors 110 and 210 as an environment information acquisition unit that is capable of acquiring the surrounding environment information of the vehicle 1, and the system control unit 25 may control the lamp units 120 and 220 and the displays 130 and 230 in a linked manner to present the vehicle information based on the environment information acquired by the external sensors 110 and 210. According to this configuration, appropriate vehicle information can be provided to the traffic person in accordance with the environment information of the outside of the vehicle.

In addition, the vehicle communication system 20 may further include the road surface drawing lamp 126 that is capable of displaying at least a part of the vehicle information on a road surface. By using the road surface drawing lamp 126 to form the road surface drawing pattern P2 on the road surface, the communication between the vehicle 1 and the traffic person can be further promoted.

In addition, the vehicle information presented by the vehicle communication system may include information indicating that the vehicle 1 is executing an automated driving mode. According to this configuration, the smooth traffic can be realized even in the automated driving mode.

In addition, the vehicle communication system 20 of the present embodiment includes the rear module 250 installed on the rear portion of the vehicle 1. The rear module 250 integrally includes the rear display 230 and the rear lamps 222L and 222R. Further, the rear module 250 is configured to be movable with respect to a vehicle body of the vehicle 1 (vehicle body). As described, since the rear module 250 in which the rear display 230 and the rear lamps 222L and 222R are integrated is movable with respect to the vehicle body main body, the rear module 250 can be handled similarly to the related-art hatchback type back door. Therefore, the operatability of the rear module 250 can be improved.

In addition, the rear module 250 further includes the external sensor 210 that is capable of acquiring the surrounding environment information of the vehicle 1, and is configured to be movable based on the environment information acquired by the external sensor 210. As described, by changing the position of the rear module 250 in accordance with the condition on the rear side of the vehicle 1, visibility of the rear display 230 and the rear lamps 222L and 222R from the rear side of the vehicle can be improved.

In addition, the external sensor 210 includes the rear camera 212 disposed at a center on a lower side of the rear display 230, and the rear LiDARs 216L and 216R disposed on lower sides of the rear lamps 222L and 222R respectively. By setting the installing position of the external sensor 210 (the rear camera 212, and the rear LiDARs 216L and 216R) in the rear module 250 as described above, space of a rear portion of the vehicle can be effectively used and the surrounding environment information of the vehicle 1 can be appropriately acquired.

In addition, the rear lamps 222L and 222R are constituted by a plurality of long light emitters 30 having different lengths. The plurality of light emitters 30 are arranged such that the light guides 30A to 30D are arranged in parallel in the left-right direction of the vehicle 1, and that the lengths of the light guides 30A to 30D decrease as the light guides 30A to 30D get away from the rear display 230. As described, by combining the long light guides 30A to 30D having different lengths with the rear display 230, the rear module 250 can exert various marker functions (for example, a turn signal, and tail and stop).

In addition, each light source 40 provided in the left and right rear lamps 222L and 222R is constituted by three first light emitting units 44A to 44C having the light emitting elements that emit light in amber, three second light emitting units 46A to 46C having the light emitting elements that emit light in red, and two third light emitting units 48A and 48B each having the light emitting elements that emit light in colors of RGB, and a substrate 42 on which these light emitting units are installed. According to this configuration, the rear lamps 222L and 222R can be caused to emit light in appropriate colors and light quantities for exerting the functions of various marker lights such as turn signals and stop, and can be combined with the rear display 230 to provide various kinds of information to a traffic person (other vehicles, pedestrians, and the like).

In addition, in each of the light guides 30A to 30D, the step 36 for reflecting the light from the light source 40 is formed on the back surface side (front end surface side) thereof, and the diffusion material is dispersed in the entire light guide. Accordingly, the entire light guides 30A to 30D can emit light substantially uniformly.

In addition, the rear display 230 disposed at the rear portion of the vehicle 1 is formed to have a curved shape that is convex rearward in the left-right direction of the vehicle 1. Accordingly, the visibility of the rear display 230 from the rear side of the vehicle 1 can be further improved.

In addition, the light guides 30A to 30D are preferably arranged on the extension line of the curved shape of the rear display 230. Accordingly, the visibility of the rear lamps 222L and 222R from the rear side of the vehicle 1 can be improved.

In addition, the system control unit 25 may be configured to turn on the plurality of light guides 30A to 30D in a stepwise manner in linkage with the information display of the rear display 230. Accordingly, the rear module 250 can exert the functions of a turn signal lamp, a tail and stop lamp, and the like.

Second Embodiment

Figure 17A:
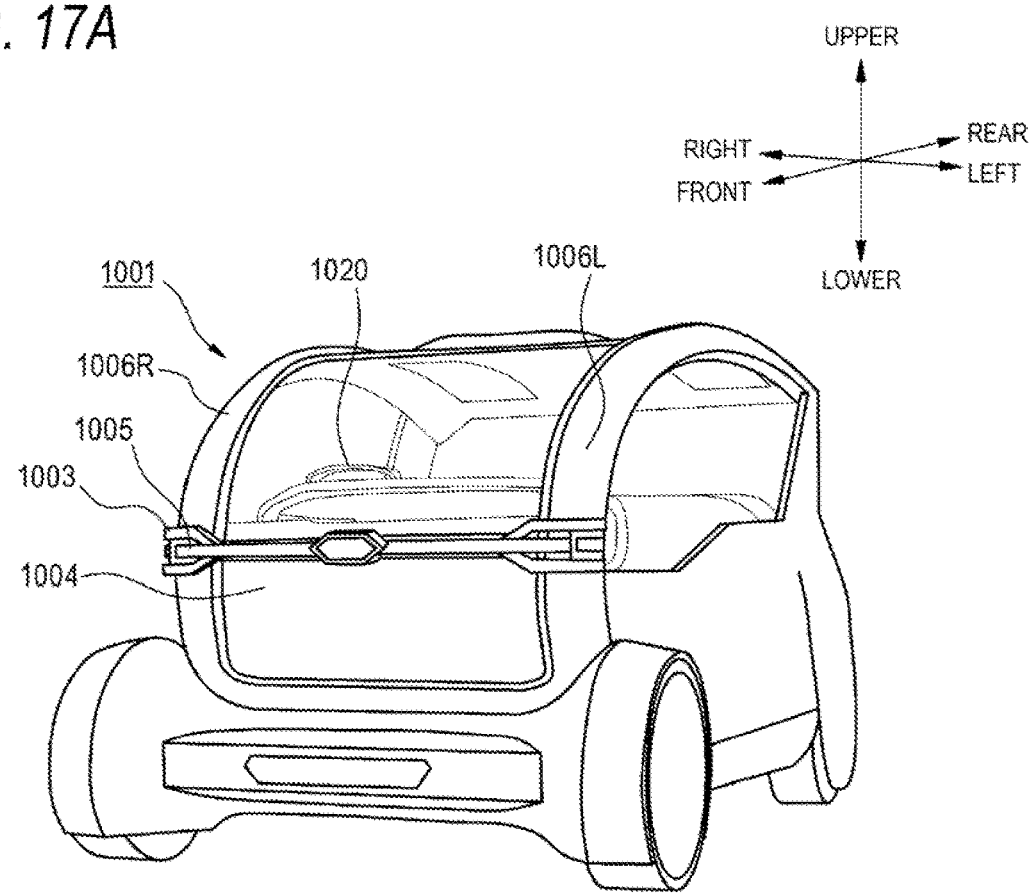
FIG. 17A is a front perspective view of a vehicle in which a front composite module is installed.
Figure 17B:
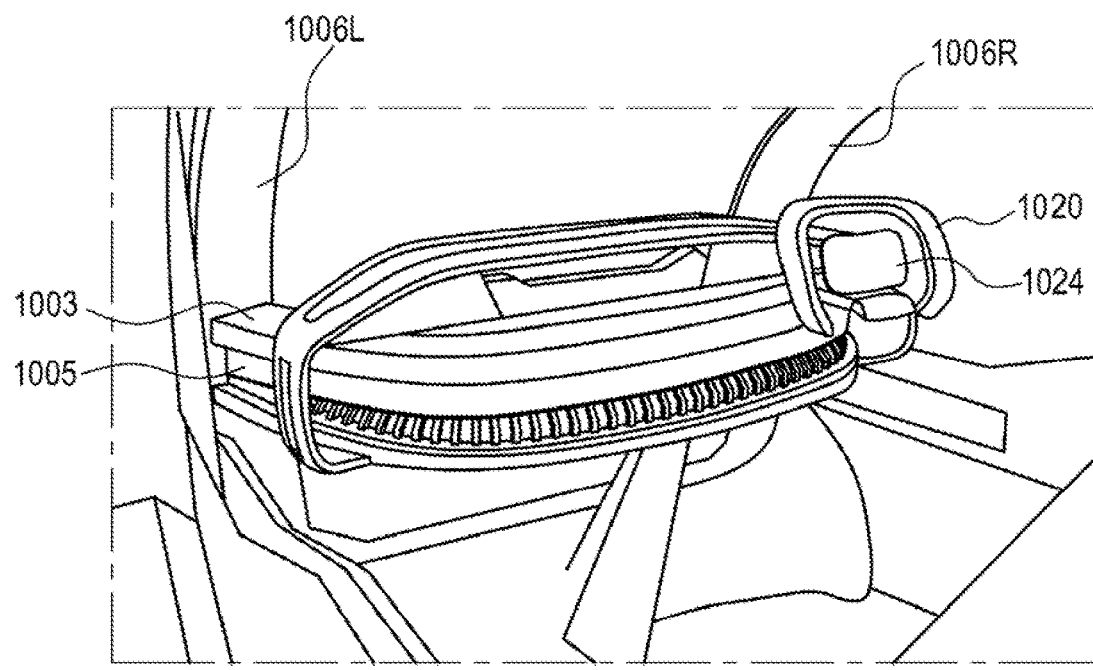
FIG. 17B is a diagram illustrating a front inner side of the vehicle of FIG. 17A.

FIGS. 17A and 17B illustrate a vehicle 1001 in which a front composite module 1003 (an example of a vehicle lamp) according to a second embodiment is installed. FIG. 17A illustrates a front perspective view of the vehicle 1001, and FIG. 17B illustrates a front inner side of the front of the vehicle 1001. The vehicle 1001 is an automobile that is capable of traveling in an automated driving mode. A front display 1004 and a front composite module 1003 are installed on a front side of the vehicle 1001. The front composite module 1003 is disposed on front pillars 1006L and 1006R that define a front portion and side portions of the vehicle.

Figure 18:
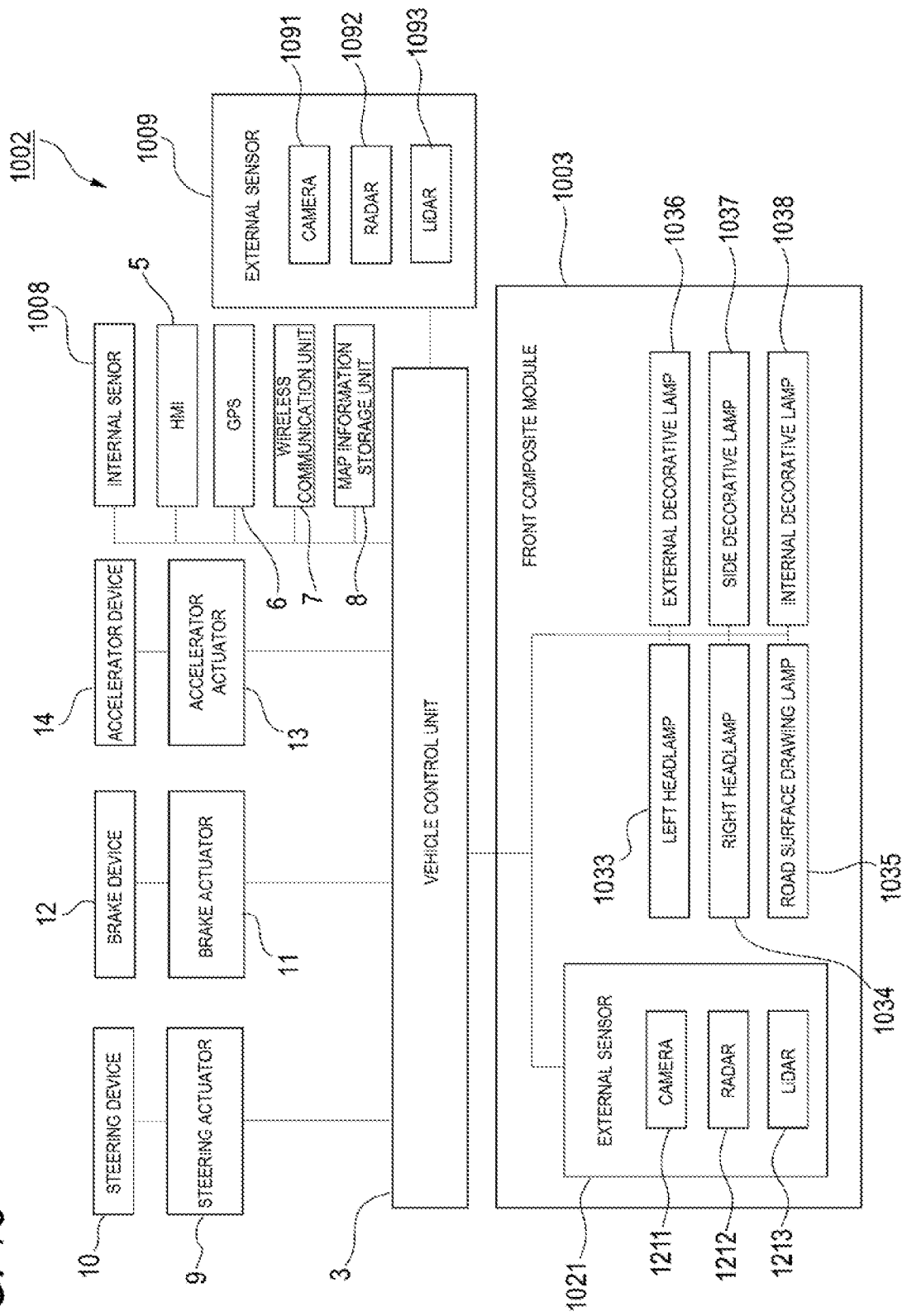
FIG. 18 is a block diagram of a vehicle system and of a front composite module system.

FIG. 18 is a block diagram of a vehicle system 1002 installed in the vehicle 1001. First, the vehicle system 1002 will be described with reference to FIG. 18. As illustrated in FIG. 18, the vehicle system 1002 includes the vehicle control unit 3, an internal sensor 1008, an external sensor 1009, the HMI 5, the GPS 6, the wireless communication unit 7, the map information storage unit 8, and the front composite module 1003. The vehicle system 1002 further includes the steering actuator 9, the steering device 10, the brake actuator 11, the brake device 12, the accelerator actuator 13, and the accelerator device 14.

The internal sensor 1008 includes an acceleration sensor, a speed sensor, a gyro sensor, and the like. The internal sensor 1008 is configured to detect a traveling state of the vehicle 1001 and output traveling state information to the vehicle control unit 3. The internal sensor 1008 may also be configured to sense an in-vehicle environment. The internal sensor 1008 may further include a seating sensor that detects whether a driver is seated in a driver's seat, a face orientation sensor that detects a direction of the driver's face, a human sensor that detects whether there is a person in the vehicle, and the like.

The external sensor 1009 includes at least one of a camera 1091, a radar 1092, and a LiDAR 1093. The external sensor 1009 is configured to detect a surrounding environment of the vehicle 1001. The external sensor 1009 may include an illuminance sensor that detects illuminance of the surrounding environment of the vehicle 1001 or an external weather sensor that detects an external weather condition.

Configurations of the camera 1091, the radar 1092, and the LiDAR 1093 are substantially the same as those of the camera 112, the radar 114, and the LiDAR 116 of the first embodiment. The camera 1091, the radar 1092, and the LiDAR 1093 are configured to detect the surrounding environment of the vehicle 1001 (other vehicles, pedestrians, road shapes, traffic signs, obstacles, and the like) and output the surrounding environment information to the vehicle control unit 3.

Figure 19A:
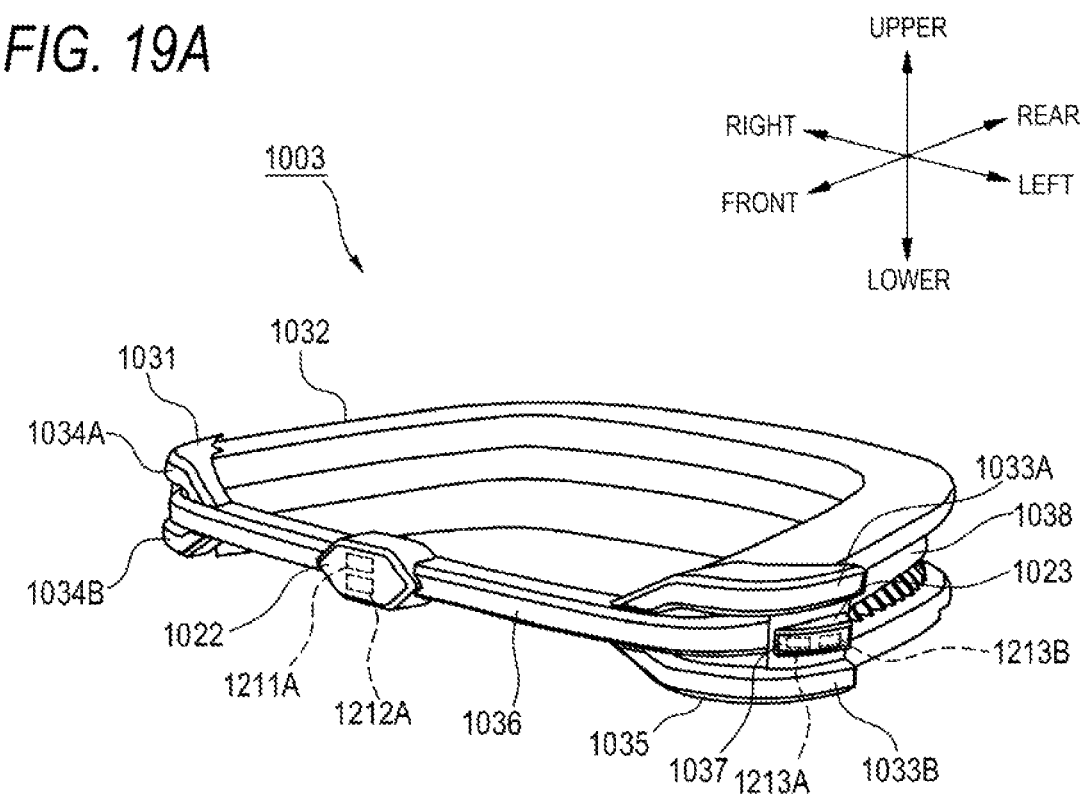
FIG. 19A is a front perspective view of a front composite module.
Figure 19B:
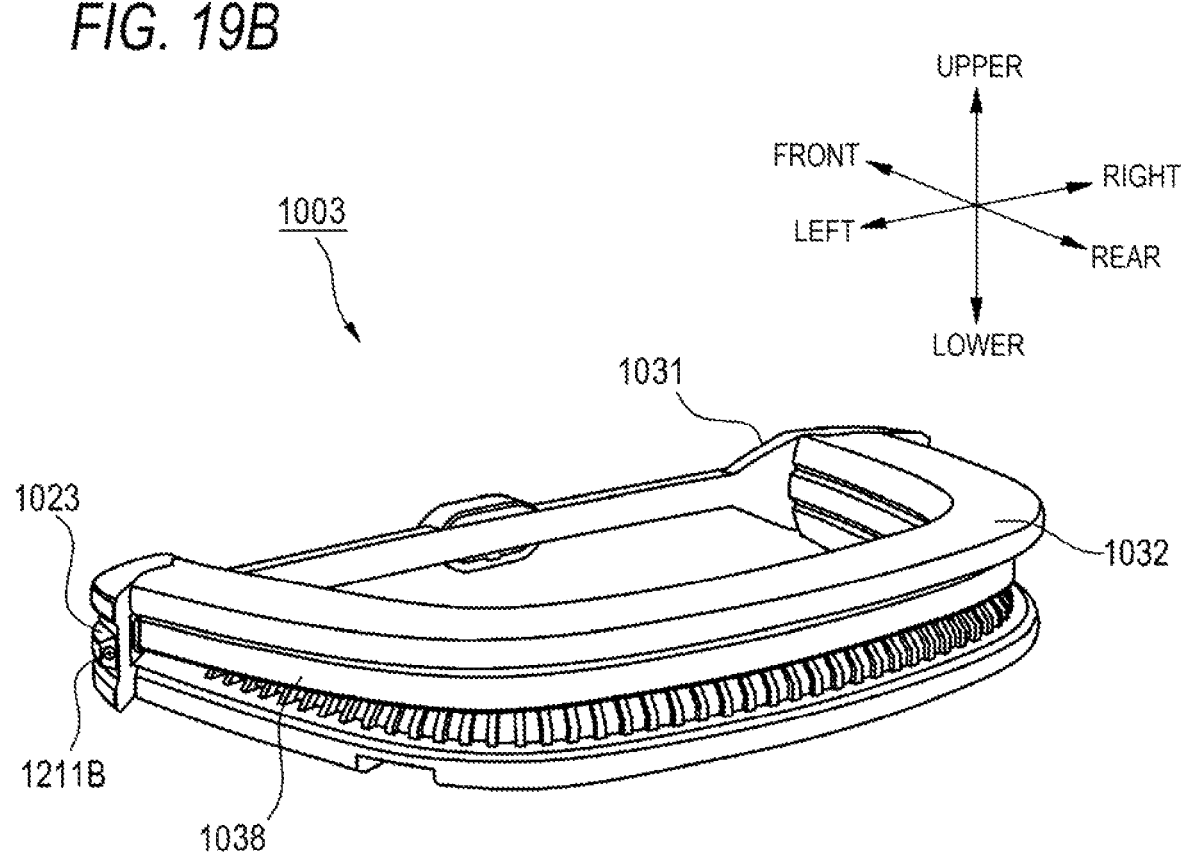
FIG. 19B is a rear perspective view of the front composite module.

Here, a specific configuration of the front composite module 1003 of the present embodiment will be described with reference to FIGS. 19A and 19B. FIG. 19A is a front perspective view of the front composite module 1003, and FIG. 19B is a rear perspective view of the front composite module 1003. The front composite module 1003 is constituted by a first lamp unit 1031, which is curved and disposed outside the vehicle, and a second lamp unit 1032, which is curved and disposed inside the vehicle. The first lamp unit 1031 and the second lamp unit 1032 are combined to form an annular shape. The first lamp unit 1031 is a structure in which a light emitting portion and an external sensor 1021 are installed. The light emitting portion of the first lamp unit 1031 is constituted by a left headlamp 1033, a right headlamp 1034, a road surface drawing lamp 1035, an external decorative lamp 1036, and a side decorative lamp 1037. The external sensor 1021 of the first lamp unit 1031 is constituted by a camera 1211, a radar 1212, and a LiDAR 1213. The second lamp unit 1032 is a structure including a light emitting portion. The light emitting portion of the second lamp unit 1032 is constituted by an internal decorative lamp 1038.

In a central portion in the left-right direction of the first lamp unit 1031 (hereinafter, referred to as a central sensor portion 1022), a front camera 1211A included in the camera 1211 and a front radar 1212A included in the radar 1212, among the external sensor 1021, are disposed. The front camera 1211A is, for example, a camera that includes a photographing element such as a CCD or a CMOS. The front radar 1212A is, for example, a millimeter-wave radar, and is used to detect a position of a target object (a traffic person or the like) at a front side of the vehicle 1001.

At left and right end portions of the first lamp unit 1031, that is, in the vicinity of connection portions with the second lamp unit 1032, a protruding portion 1023 protruding leftward from the front pillar 1006L of the vehicle 1001 and a protruding portion 1023 protruding rightward from the front pillar 1006R of the vehicle 1001 are provided respectively. In each protruding portion 1023, a side camera 1211B included in the camera 1211, and a front LiDAR 1213A and a side LiDAR 1213B included in the LiDAR 1213 are disposed. The side camera 1211B is disposed so as to face the outside of the vehicle from a rear end surface of the protruding portion 1023, and is used to photograph a rear side of the vehicle 1001 to obtain an image thereof and display the image on an in-vehicle display, for example, a steering display 1024 (see FIG. 17B) in a steering wheel 1020. The front LiDAR 1213A and the side LiDAR 1213B are disposed on a side surface side of the protruding portion 1023, and are used to detect a target object (a traffic person or the like) at a front side and a lateral side of the vehicle 1001.

Figure 20:
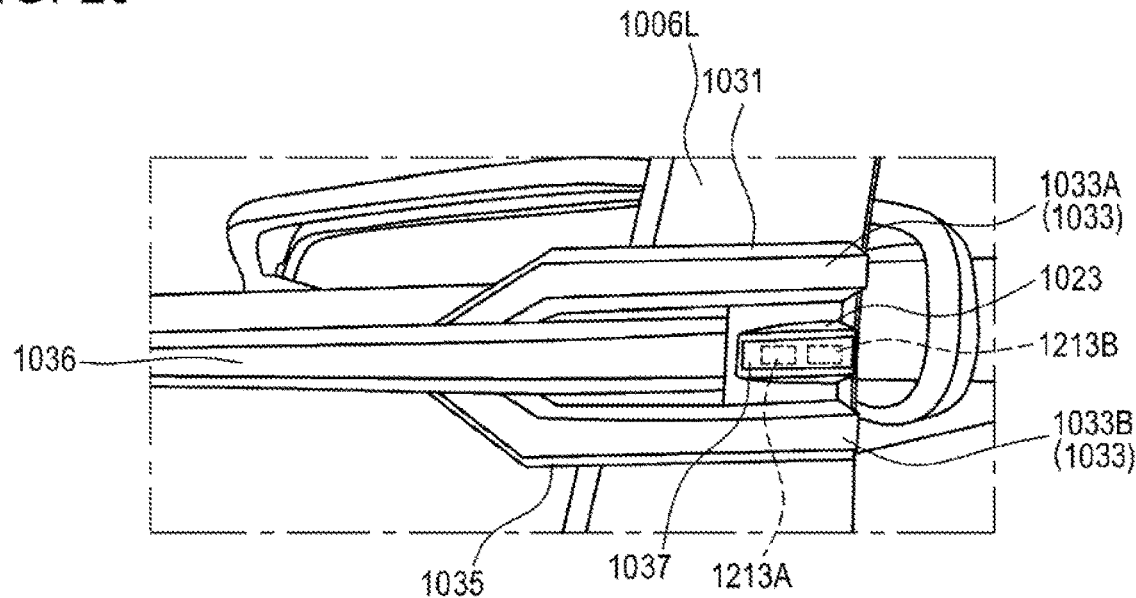
FIG. 20 is an enlarged view of a left portion of a first lamp unit.

Here, the left headlamp 1033 and the right headlamp 1034 will be described with reference to FIGS. 19A, 19B, and 20. FIG. 20 is an enlarged view of a left portion of the first lamp unit 31. The left headlamp 1033 is provided at a position intersecting the left front pillar 1006L of the vehicle 1001, which is a left end of the first lamp unit 1031. The right headlamp 1034 is provided at a position intersecting the right front pillar 1006R (see FIG. 17A) of the vehicle 1001, which is a right end of the first lamp unit 1031. The left headlamp 1033 is constituted by, for example, a light source (not illustrated), and a light emitting portion formed of a resin molded product for guiding light from the light source and emitting the light to the front side of the vehicle in a predetermined light distribution pattern. The light emitting portion is constituted by an upper light emitting portion 1033A disposed on an upper side and a lower light emitting portion 1033B disposed on a lower side. The right headlamp 1034 is constituted by, for example, a light source (not illustrated) and a light emitting portion formed of a resin molded product for guiding light from the light source and emitting the light to the front side of the vehicle in a predetermined light distribution pattern. The light emitting portion is constituted by an upper light emitting portion 1034A disposed on an upper side and a lower light emitting portion 1034B disposed on a lower side. The upper light emitting portions 1033A and 1034A and the lower light emitting portions 1033B and 1034B exert functions of a so-called high beam lamp and a low beam lamp. Each pair of the upper light emitting portion 1033A and the lower light emitting portion 1033B and the upper light emitting portion 1034A and the lower light emitting portion 1034B is disposed so as to sandwich the protruding portion 1023 in which the side camera 121/ B, the front LiDAR 1213A and the side LiDAR 1213B are disposed.

Referring back to FIGS. 19A and 19B, the external decorative lamp 1036, the side decorative lamp 1037, and the internal decorative lamp 1038 will be described. The external decorative lamp 1036 is formed to extend leftward and rightward from the central sensor portion 1022 in which the front camera 1211A and the front radar 1212A are disposed, the left and right ends thereof are respectively disposed between the upper light emitting portion 1033A and the lower light emitting portion 1033B of the left headlamp 1033 and between the upper light emitting portion 1034A and the lower light emitting portion 1034B of the right headlamp 1034. The external decorative lamp 1036 is constituted by, for example, a plurality of light sources (not illustrated) arranged at predetermined intervals and alight emitting portion that guides light emitted from the plurality of light sources. By causing the entire or a part of the external decorative lamp 1036 thus configured to emit light based on a control signal from the vehicle control unit 3, it is possible to form a seamless light emitting pattern continuous with the left and right headlamps 1033 and 1034.

The side decorative lamp 1037 is disposed on aside surface of the protruding portion 1023. The side decorative lamp 1037 is constituted by, for example, a plurality of light sources (not illustrated) arranged at predetermined intervals and a light emitting portion that guides light emitted from the plurality of light sources. By causing the side decorative lamp 1037 to emit light based on a control signal from the vehicle control unit 3, it is possible to form a light emitting pattern linked with the left and right headlamps 1033 and 1034 and the external decorative lamp 1036. The side decorative lamp 1037 may have a function of a position lamp, a daytime running lamp, a turn signal lamp, or the like.

The internal decorative lamp 1038 is disposed along a curved shape of the second lamp unit 1032 at a central portion in the upper-lower direction of the second lamp unit 1032. The internal decorative lamp 1038 is used to transmit vehicle information and surrounding environment information to a user in the vehicle. The internal decorative lamp 1038 is constituted by, for example, a plurality of light sources (not illustrated) arranged at predetermined intervals and a light emitting portion that guides light emitted from the plurality of light sources. The internal decorative lamp 1038 is preferably configured to be capable of emitting light in various colors and light emitting patterns, based on a control signal from the vehicle control unit 3. By causing the internal decorative lamp 1038 to emit light in a predetermined light emitting pattern, for example, it is possible to notify the user in the vehicle of information such as a notice of departure and stop during automated driving, or a sign at the time of finding an acquaintance outside the vehicle.

Figure 21:
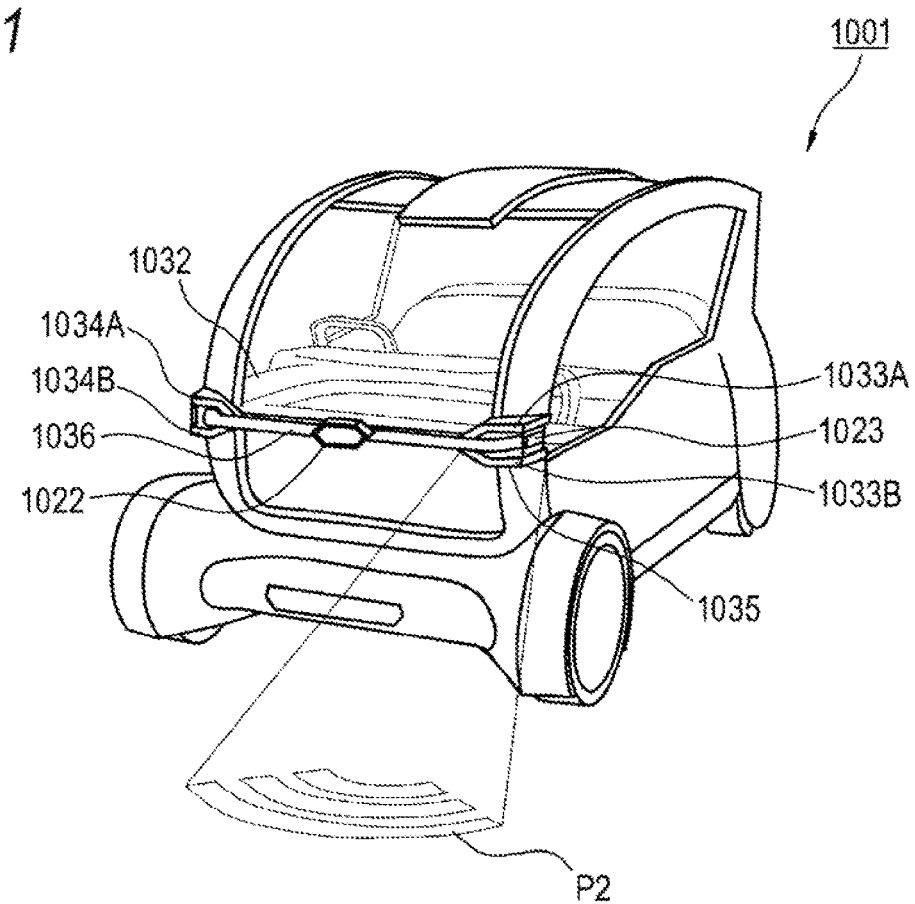
FIG. 21 is a diagram illustrating a state in which a road surface drawing pattern is projected onto a road surface by a road surface drawing lamp.

Here, the road surface drawing lamp 1035 will be described with reference to FIG. 21. FIG. 21 is a diagram illustrating a state in which the road surface drawing pattern P2 is projected onto a road surface by a road surface drawing lamp. The road surface drawing lamp 1035 is disposed on a lower side of each of the lower light emitting portions 1033B and 1034B of the left and right headlamps 1033 and 1034. The road surface drawing lamp 1035 can project the predetermined road surface drawing pattern P2 onto a road surface at the front side of the vehicle 1001 based on a control signal from the vehicle control unit 3. The road surface drawing pattern P2 is used to present a traveling direction, a start cue, and the like of the vehicle 1001 by light and alert a condition of the vehicle 1001 to the surroundings. The road surface drawing lamp 1035 may be configured to form a predetermined road surface drawing pattern based on surrounding environment information detected by the external sensors 1009 and 1021.

Figure 22A:
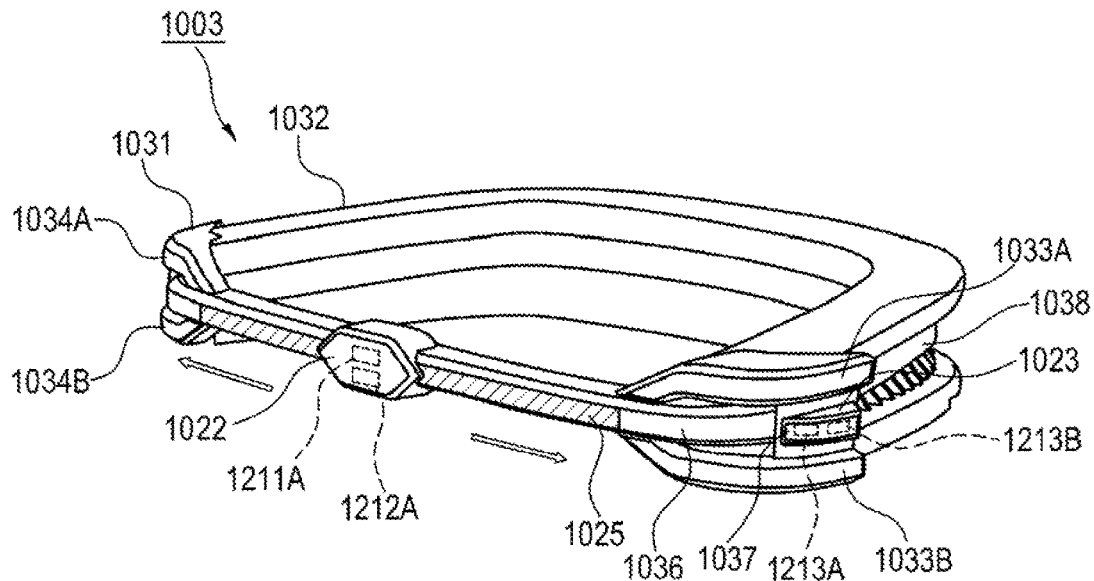
FIG. 22A is a diagram illustrating a mode of light emission of a front composite module.
Figure 22B:
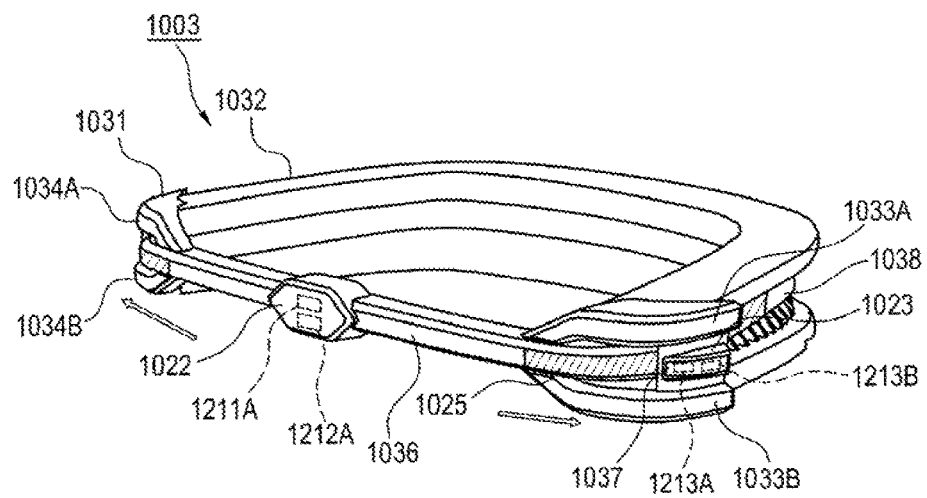
FIG. 22B is a diagram illustrating a mode of light emission of the front composite module.
Figure 22C:
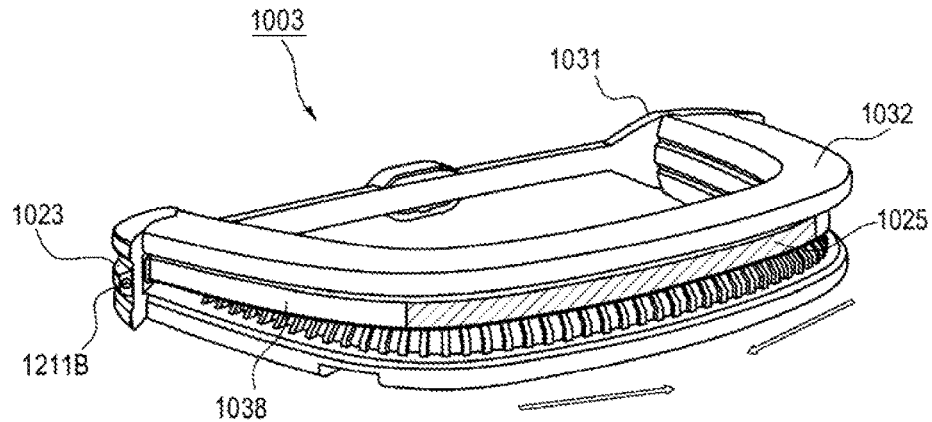
FIG. 22C is a diagram illustrating a mode of light emission of the front composite module.

Next, a mode of light emission of the front composite module 1003 will be described with reference to FIGS. 22A to 22C. FIGS. 22A to 22C are diagrams illustrating the mode of light emission of the front composite module 1003. When the vehicle 1001 is in an automated driving mode, the front composite module 1003 receives a signal from the vehicle control unit 3 and emits light in a light emitting mode associated with the automated driving mode. Specifically, first, the external decorative lamp 1036 emits blue light 1025 from both ends in the left-right direction of the central sensor portion 1022 of the first lamp unit 1031. The blue light 1025 extends in a longitudinal direction of the external decorative lamp 1036 and is displayed at a predetermined length so as to be visible. Further, the external decorative lamp 1036 emits light such that the blue light 1025 moves from the central sensor portion 1022 toward the left and right ends of the first lamp unit 1031 (FIG. 22A). At this time, when the blue light 1025 of the external decorative lamp 1036 approaches the left and right ends of the first lamp unit 1031, the side decorative lamp 1037 may emit the blue light 1025. Further, from the time when the left and right ends of the external decorative lamp 1036 emit light, the internal decorative lamp 1038 emits light such that the blue light 1025 moves from both ends in the left-right direction of the second lamp unit 1032 to a center thereof (FIG. 22B). At this time, blue light 1025 is displayed so as to have a predetermined length in the longitudinal direction over the external decorative lamp 1036 and the internal decorative lamp 1038. When the blue light 1025 reaches a predetermined distance from both ends in the left-right direction of the internal decorative lamp 1038, the external decorative lamp 1036 is turned off. The blue light 1025 at both ends of the internal decorative lamp 1038 merges at the center (FIG. 22C). Finally, the internal decorative lamp 1038 is turned off, and the external decorative lamp 1036 emits light again, and the light emission described above is repeated during the automated driving mode. By repeating such a sequence of light emission, the front composite module 1003 displays behavioral information relating to a behavior of the vehicle 1001.

Further, for example, when the vehicle 1001 starts to decelerate, the front composite module 1003 may receive a signal indicating that deceleration is started from the vehicle control unit 3, and change the blue light 1025 to yellow light in the sequence of light emission described above. Accordingly, the behavior of the vehicle can be provided in advance to a target outside the vehicle such as a pedestrian or a following vehicle and to a passenger in the vehicle. In addition, the front composite module 1003 may change the blue light 1025 to light other than yellow light before deceleration is actually started, and may change the light other than yellow light to yellow light after the deceleration actually starts. Further, when the vehicle is stopped shortly after being decelerated, the front composite module 1003 may further change the yellow light to red light.

For example, when the vehicle 1001 turns left, the front composite module 1003 may receive a signal indicating a left turn from the vehicle control unit 3, and emit light such that orange light is directed from a left side of a central portion of each of the external decorative lamp 1036 and the internal decorative lamp 1038 to the left headlamp 1033. The orange light of the external decorative lamp 1036 and the internal decorative lamp 1038 merges in the vicinity of the left headlamp 1033. By repeating such light emission in the sequence, a behavior of the vehicle 1001 can be provided in advance to a target outside the vehicle such as a pedestrian or a following vehicle and to a passenger in the vehicle.

For example, when the vehicle 1001 passes an oncoming vehicle that is owned and/or boarded by an acquaintance of a passenger of the vehicle 1001, the front composite module 1003 may emit light in a light emitting mode that prompts communication between the passenger and the acquaintance, in combination with the light emitting mode associated with the automated driving mode. Specifically, the vehicle control unit 3 of the vehicle 1001 receives vehicle information of the oncoming vehicle from the external sensors 1009 and 1021, the wireless communication unit 7, and the like, and determines whether the owner or the passenger of the oncoming vehicle is an acquaintance of the passenger of the vehicle 1001. When the owner or the passenger of the oncoming vehicle is an acquaintance of the passenger of the vehicle 1001, the front composite module 1003 receives a signal from the vehicle control unit 3. Upon receiving the signal, the external decorative lamp 1036 may emit purple light in the vicinity of the left headlamp 1033 and the right headlamp 1034 and further the internal decorative lamp 1038 may emit light such that the purple light moves to the center of the internal decorative lamp 1038, before the vehicles pass each other. At this time, the internal decorative lamp 1038 may emit the blue light 1025, and the purple light may be mixed with the blue light 25. Accordingly, the passenger of the vehicle 1001 can know that the owner and/or the passenger of the oncoming vehicle is an acquaintance, and communication between the passengers can be promoted.

As described above, the front composite module 1003 of the present embodiment includes the headlamps 1033 and 1034 that emit light to the outside of the vehicle, and the sensor (the external sensor 1021), and is disposed at the front pillars 1006L and 1006R of the vehicle 1001 or at an extension region on a lower side thereof. With respect to the front pillars 1006L and 1006R or the extension region on a lower side thereof, portions in contact with at least one of a front window and a side window are taken as the front pillars 1006L and 1006R, and a portion that is on a lower side of the front pillars 1006L and 1006R and that is not in contact with either the front window or the side window is taken as the extension region on a lower side of the front pillars 1006L and 1006R. Since the front composite module 1003 is disposed at the front pillars 1006L and 1006R or the extension region on a lower side thereof, a novel design characteristic is exhibited, and since the headlamps 1033 and 1034 and the sensor (the external sensor 1021) are accommodated in the same module, arrangement efficiency is good, and the in-vehicle space can be efficiently used.

In addition, the headlamps 1033 and 1034 may be provided on the left and right of the vehicle, respectively. The front composite module 1003 may further include a first connection portion (a housing including the external decorative lamp 1036) that connects the headlamps 1033 and 1034 on both sides outside the vehicle, and a second connection portion (a housing including the internal decorative lamp 1038) that connects the headlamps 1033 and 1034 on both sides inside the vehicle. The headlamps 1033 and 1034, the first connection portion (the housing including the external decorative lamp 1036) and the second connection portion (the housing including the internal decorative lamp 1038) may be arranged in an annular shape. In this case, assembly at the time of assembling the vehicle 1001 is made easy, and a novel design is constituted with the headlamps 1033 and 1034, the first connection portion (the housing including the external decorative lamp 1036) and the second connection portion (the housing including the internal decorative lamp 1038).

In addition, the headlamps 1033 and 1034 of the front composite module 1003 may include a first light emitting portion on an upper side (the upper light emitting portions 1033A and 1034A) and a second light emitting portion on a lower side (the lower light emitting portions 1033B and 1034B), and a sensor (at least one of the side camera 1211B, the front LiDAR 1213A, and the side LiDAR 1212B) may be disposed between the first light emitting portion (the upper light emitting portions 1033A and 1034A) and the second light emitting portion (the lower light emitting portions 1033B and 1034B). In this case, the arrangement efficiency of the headlamps 1033 and 1034 and the sensor (at least one of the side camera 1211B, the front LiDAR 1213A, and the side LiDAR 1212B) is good, and the in-vehicle space can be efficiently used.

In addition, as described above, the front composite module 1003 of the present embodiment includes the first lamp unit 1031 and the second lamp unit 1032. The first lamp unit 1031 includes the first light emitting portion (the external decorative lamp 1036) that is capable of emitting light toward the outside of the vehicle, the second lamp unit 1032 includes the second light emitting portion (the internal decorative lamp 1038) that is capable of emitting light toward the inside of the vehicle, and the first lamp unit 1031 and the second lamp unit 1032 are disposed such that the first light emitting portion (the external decorative lamp 1036) and the second light emitting portion (the internal decorative lamp 1038) are continuous. Since the front composite module 1003 is configured such that the light emitting portions (the external decorative lamp 1036 and the internal decorative lamp 1038) capable of emitting light toward the outside and inside of the vehicle are continuous, a novel design characteristic is exhibited and a new impression can be provided to a pedestrian and a passenger.

In addition, in the front composite module 1003, the first lamp unit 1031 and the second lamp unit 1032 may be arranged such that the first light emitting portion (the external decorative lamp 1036) and the second light emitting portion (the internal decorative lamp 1038) are combined in an annular shape. In this case, since the light emitting portions (the external decorative lamp 1036 and the internal decorative lamp 1038) capable of emitting light toward the outside and inside of the vehicle are configured to be in an annular shape and continuous, a further novel design characteristic is exhibited and a new impression can be provided to the pedestrian and the passenger. Further, assembly at the time of assembling the vehicle is made easy.

In addition, in the front composite module 1003, at least one of the first light emitting portion (the external decorative lamp 1036) and the second light emitting portion (the internal decorative lamp 1038) may be capable of displaying the behavioral information relating to the behavior of the vehicle 1001. In this case, since the information relating to the behavior of the vehicle 1001 can be displayed, the behavior of the vehicle 1001 can be transmitted to at least one of the target outside the vehicle such as the pedestrian and the passenger in the vehicle.

In addition, in the front composite module 1003, the first light emitting portion (the external decorative lamp 1036) and the second light emitting portion (the internal decorative lamp 1038) may be capable of displaying the behavioral information relating to the behavior of the vehicle 1001. In this case, since the information relating to the behavior of the vehicle 1001 can be displayed both outside and inside the vehicle, the behavior of the vehicle 1001 can be transmitted to the target outside the vehicle such as the pedestrian and the passenger in the vehicle.

In addition, the behavioral information may include prediction information relating to the behavior of the vehicle 1001. In this case, since not only the information relating to the current behavior of the vehicle 1001 but also the prediction information relating to future behavior of the vehicle 1001 is included, prediction of the future behavior of the vehicle 1001 can be transmitted to at least one of the target outside the vehicle such as the pedestrian and the passenger in the vehicle.

In addition, in the front composite module 1003, at least one of the first light emitting portion (the external decorative lamp 1036) and the second light emitting portion (the internal decorative lamp 1038) may display information for communicating with a target outside or inside the vehicle. In this case, the front composite module 1003 can communicate with at least one of the target outside the vehicle such as the pedestrian and the passenger in the vehicle, thereby promoting communication between persons by attracting attention of a person in the vehicle 1001 and of a pedestrian.

Although the embodiments of the present invention have been described above, it is needless to say that the technical scope of the present invention should not be interpreted as being limited to the description of the embodiments. It is to be understood by those skilled in the art that the present embodiment is merely an example, and various modifications can be made within the scope of the invention described in the claims. The technical scope of the present invention should be determined based on the scope of the invention described in the claims and the scope of equivalents thereof.

In the description of the first embodiment, a mode in which the system control unit 25 is independent of the vehicle control unit 3 has been described, but the present invention is not limited thereto. The system control unit may be installed as one function of the vehicle control unit.

In addition, in the description of the second embodiment, a mode in which the vehicle control unit 3 performs control of the vehicle 1001 and control of the front composite module 1003 has been described, but the present invention is not limited thereto. For example, a system control unit independent of the vehicle control unit 3 may be provided, and the front composite module 1003 may be controlled by the system control unit.

In addition, in the embodiments described above, the driving mode of the vehicle is described as including the fully automated driving mode, the advanced driving support mode, the driving support mode, and the manual driving mode, but the driving mode of the vehicle should not be limited to these four modes.

Further, a classification and a display form of the driving mode of the vehicle may be appropriately changed according to laws or regulations related to automated driving in each country. Similarly, the definitions of the "fully automated driving mode", the "advanced driving support mode", and the "driving support mode" described in the description of the embodiments described above are merely examples, and the definitions may be appropriately changed according to laws or regulations related to automated driving in each country.

In the embodiments described above, the surrounding environment information relating to the periphery of the vehicle is acquired by an external sensor that includes a LiDAR, a camera, a radar, and the like, but the present invention is not limited to this example. For example, the surrounding environment information may be acquired using road-to-vehicle communication between the vehicles 1 and 1001 and a base station device, or vehicle to-vehicle communication between the vehicles 1 and 1001 and an in-vehicle device of another vehicle. The surrounding environment information may be acquired by combining a detection signal of the external sensor with the road-to-vehicle communication or the vehicle-to-vehicle communication. As described, various kinds of environment information can be acquired by using the road-to-vehicle communication or the vehicle-to-vehicle communication.

In addition, the system control unit 25 may be configured to control at least one of the headlamps 122L and 122R and the front display 130 and at least one of the rear lamps 222L and 222R and the rear display 230 in a linked manner to present the vehicle information. For example, in a case of passing a traffic person (in particular, an acquaintance of a user in the vehicle), the system control unit 25 presents a smiling face illustrated in FIG. 7 by using the headlamps 122L and 122R and the front display 130, and displays the pattern P4 (a mark of a smiling face) illustrated in FIG. 16 on the rear display 230. Accordingly, new communication between the vehicle 1 and the traffic person can be supported.

In addition, in the first embodiment described above, the rear module 250 disposed at the rear portion of the vehicle 1 is taken as an example of the vehicle module, but the present invention is not limited to this example. In the future, in particular, the vehicle in the automated driving mode may be capable of traveling in various directions, and the directions of front, rear, left, and right may be changed as appropriate. Therefore, the vehicle module of the present embodiment can be installed at an optional position as long as the position is an outer surface of the vehicle. For example, the vehicle module in which the display, the lamp, and the sensor are integrated may be disposed at the left and right door portions or the front portion of the vehicle.

Although the light emission state of the front composite module 1003 has been described using an example of specific colors in the second embodiment described above, the color to be employed can be optionally changed, and a plurality of colors may be employed in combination. Further, the left headlamp 1033 and the right headlamp 1034 may also be in a mode of being capable of presenting various colors, and the color may be in a mode of changing at the time when the vehicle 1001 is started or other times.

This application is based on Japanese Patent Application No. 2017-235247 filed on Dec. 7, 2017, Japanese Patent Application No. 2017-235248 filed on Dec. 7, 2017, Japanese Patent Application No. 2017-235249 filed on Dec. 7, 2017, and Japanese Patent Application No. 2017-235250 filed on Dec. 7, 2017, the contents of which are incorporated herein by reference.

The invention claimed is:

1. A vehicle communication system installed in a vehicle, comprising:
   a front module disposed at a front portion of the vehicle;
   a lamp for illumination, display or signal, the lamp includes left and right headlamps that constitute a part of the front module;
   a sensor that is configured to acquire environment information of surroundings of the vehicle, the sensor is accommodated in the front module;
   a display that is configured by a planar light emitter and has an information display function; and
   a control unit that is configured to control turning-on of the lamp and of the display,
   wherein
   the control unit is configured to control the lamp and the display in a linked manner, and to present vehicle information indicating a condition of the vehicle by a combination of light emission of the lamp and information display of the display.

2. The vehicle communication system according to claim 1, wherein
   the display includes a first display that is disposed on a lower side of the front module, and
   the control unit is configured to present a human facial expression as the vehicle information by turning on the headlamp and causing the first display to display a pattern of a shape imitating a human mouth.

3. The vehicle communication system according to claim 1, wherein
   the display includes a second display that is disposed at a rear portion of the vehicle,
   the lamp includes a marker lamp that is disposed on left and right sides of the second display, and
   the control unit is configured to control information display of the second display and turning-on of the marker light in a linked manner to exert a predetermined marker function.

4. The vehicle communication system according to claim 2, wherein
   the display includes a second display that is disposed at a rear portion of the vehicle,
   the lamp includes a marker lamp that is disposed on left and right sides of the second display, and
   the control unit is configured to control at least one of the headlamp and the first display and at least one of the marker lamp and the second display in a linked manner to present the vehicle information.

5. The vehicle communication system according to claim 1,
   wherein
   the control unit is configured to control the lamp and the display in a linked manner based on the environment information to present the vehicle information.

6. The vehicle communication system according to claim 1, further comprising:
   a road surface drawing lamp that is configured to display at least a part of the vehicle information on a road surface.

7. The vehicle communication system according to claim 1, wherein
   the vehicle information includes information indicating that the vehicle is executing an automated driving mode.

8. The vehicle communication system according to claim 1, wherein the sensor and the lamp are integrated in the front module.

9. The vehicle communication system according to claim 8, wherein the front module is exposed from a front surface of the vehicle in a strip across the width of the vehicle.

10. The vehicle communication system according to claim 1, wherein the front module is annular in overall shape and has a curved outer module disposed outside the vehicle interior of the vehicle and a curved inner module disposed inside the vehicle interior of the vehicle.

11. A vehicle communication system installed in a vehicle, comprising:
   a lamp for illumination, display or signal;
   a display that is configured by a planar light emitter and has an information display function; and
   a control unit that is configured to control turning-on of the lamp and of the display,
   wherein
   the control unit is configured to control the lamp and the display in a linked manner, and to present vehicle information indicating a condition of the vehicle by a combination of light emission of the lamp and information display of the display;
   the display includes a second display that is disposed at a rear portion of the vehicle,
   the lamp includes a marker lamp that is disposed on left and right sides of the second display;
   the control unit is configured to control information display of the second display and turning-on of the marker light in a linked manner to exert a predetermined marker function;
   the marker lamp is configured by a plurality of vertically elongated light emitters,
   the plurality of light emitters are arranged in parallel in a left-right direction of the vehicle, and
   the control unit is configured to turn on the plurality of light emitters in a stepwise manner in linkage with the second display.

12. The vehicle communication system according to claim 11, wherein
   the second display is formed to have a curved shape in the left-right direction, and
   the plurality of light emitters are arranged on an extension line of the curved shape of the second display.

* * * * *